US006587187B2

(12) United States Patent
Watanabe et al.

(10) Patent No.: US 6,587,187 B2
(45) Date of Patent: Jul. 1, 2003

(54) TIME MEASURING SYSTEM AND RELATED DISTANCE MEASURING SYSTEM

(75) Inventors: Takamoto Watanabe, Nagoya (JP); Noriaki Shirai, Kariya (JP); Takeshi Matsui, Toyohashi (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 10/043,249

(22) Filed: Jan. 14, 2002

(65) Prior Publication Data

US 2002/0093640 A1 Jul. 18, 2002

(30) Foreign Application Priority Data

Jan. 18, 2001 (JP) ........................... 2001-010470

(51) Int. Cl.[7] .................... G01C 3/08; G01S 13/08
(52) U.S. Cl. ................... 356/5.01; 356/5.03; 342/118
(58) Field of Search .............. 356/5.01–5.15; 342/123, 124, 127, 128, 118, 134, 135, 145; 367/124–128; 702/79, 159

(56) References Cited

U.S. PATENT DOCUMENTS 5,075,878 A * 12/1991 Ohtomo et al. ............. 702/176
5,194,906 A * 3/1993 Kimura et al. .............. 356/5.11
5,818,797 A   10/1998 Watanabe et al.
6,218,982 B1   4/2001 Shirai et al.
6,393,377 B1 * 5/2002 Shirai et al. ................. 702/159

FOREIGN PATENT DOCUMENTS

| JP | A-4-15593 | 1/1992 |
| JP | B2-7-7081 | 1/1995 |
| JP | A-10-54887 | 2/1998 |
| JP | A-2000-121726 | 4/2000 |
| JP | A-2000-137076 | 5/2000 |

* cited by examiner

Primary Examiner—Thomas H. Tarcza
Assistant Examiner—Brian Andrea

(57) ABSTRACT

A coarse measuring circuit measures an approximate measurement object time DU based on a first reference clock CK10. The approximate measurement object time represents a duration from a measurement start time to an input time of measurement object pulse PBr. A fine measuring circuit, cooperating with the coarse measuring circuit and using a shorter reference time, measures a time difference between a change point of the first reference clock CK10 and the input time of measurement object pulse PBr as a correction time DD of the approximate measurement object time DU, thereby obtaining a precise measurement objet time DT.

36 Claims, 6 Drawing Sheets

TIME MEASURING SYSTEM AND RELATED DISTANCE MEASURING SYSTEM

BACKGROUND OF THE INVENTION

The present invention relates to a distance measuring apparatus and method for measuring a measurement object time representing a duration from a measurement start time to an input of measurement object pulse, and also relates to a distance measuring apparatus and method for measuring a distance from the time measuring apparatus to a measurement object.

A spectrum spread type distance measuring apparatus, which measures a distance based on a pseudo-random noise code (hereinafter, abbreviated as PN code) such as a M-sequences code, is conventionally known and used in an automotive vehicle to measure a distance from this vehicle to a preceding vehicle (i.e., an object or obstacle ahead of this vehicle).

This kind of distance measuring apparatus is characterized in that an electromagnetic wave is amplitude modulated based on a PN code having a predetermined bit length and is transmitted to a measurement object. The distance measuring apparatus receives a reflection wave of the transmitted electromagnetic wave reflected by the measurement object and demodulates a binary signal corresponding to the PN code. The distance measuring apparatus obtains a correlation value between the demodulated binary signal and the PN code, and detects a specific time at which the correlation value is maximized. Then, the distance measuring apparatus detects a duration (i.e., time interval) required for the electromagnetic wave to trip (i.e., go and return) between the distance measuring apparatus and the measurement object, and finally calculates a distance based on the detected trip time and the speed of electromagnetic wave ($3 \times 10^5$ km/sec).

However, according to the spectrum spread type distance measuring apparatus, the time resolution in the measurement of the trip time is substantially limited by a transmission clock (hereinafter, referred to as reference clock) used in the modulation of electromagnetic wave according to the PN code. For example, the time resolution corresponding to the clock frequency of 20 MHz is 50 nsec (=1 [sec]/$20 \times 10^6$). The corresponding measurable distance resolution is thus limited to 7.5 m (=$3 \times 10^8$ [m/sec]$\times 50 \times 10^{-9}$ [sec]/2).

To improve the measurable distance resolution in the spectrum spread type distance measuring apparatus, the unexamined Japanese patent publication No. 2000-121726 proposes to transmit and receive one additional pulse of electromagnetic wave and measures an error component of the trip time by using a gate delay time of a gate circuit which has a high resolution equivalent to several nsec or less, thereby correcting the trip time based on a detected error component.

However, the above-described technique takes a relatively long time to accomplish one complete time measurement operation because it is necessary to separately perform two stages of measurements, i.e., a coarse measurement based on the reference clock (having a low resolution) and a fine measurement based on the gate delay time (having a high resolution).

Furthermore, the electromagnetic wave used in the distance measuring apparatus is a laser beam which is emitted from a laser diode. So frequently actuating or driving the laser diode will lead to a large amount of heat generation and deteriorate the laser diode.

SUMMARY OF THE INVENTION

In view of the foregoing problems of the prior art, the present invention has an object to provide a time measuring apparatus and method capable of measuring a duration from a measurement start time to an input time of measurement object pulse within a short period of time by simultaneously performing a coarse measurement based on a reference clock and a fine measurement based on a shorter reference time (e.g., a gate delay time).

Furthermore, the present invention has an object to provide a distance measuring apparatus incorporating the time measuring apparatus as well as a distance measuring method incorporating the time measuring method.

To accomplish the above and other related objects, the present invention provides a time measuring apparatus which comprises first reference clock generating means for generating a first reference clock at predetermined periods and coarse measuring means for measuring an approximate measurement object time based on the first reference clock. The approximate measurement object time represents a duration from a measurement start time to an input time of measurement object pulse. This apparatus is characterized by fine measuring means which cooperates with the coarse measuring means and uses a reference time of predetermined periods shorter than those of the first reference clock, for measuring a time difference between a change point (e.g., a leading edge or a trailing edge) of the first reference clock and the input time of measurement object pulse as a correction time of the approximate measurement object time. A precise measurement objet time is obtained based on the approximate measurement object time measured by the coarse measuring means and the correction time measured by the fine measuring means.

Meanwhile, the present invention provides a time measuring method comprising the steps of generating a first reference clock at predetermined periods, and measuring an approximate measurement object time based on the first reference clock, the approximate measurement object time representing a duration from a measurement start time to an input time of measurement object pulse. This method is characterized by the steps of measuring a time difference between a change point of the first reference clock and the input time of measurement object pulse as a correction time of the approximate measurement object time by using a reference time of predetermined periods shorter than those of the first reference clock, and obtaining a precise measurement objet time based on the approximate measurement object time and the correction time.

According to the time measuring apparatus and method of this invention, it becomes possible to simultaneously perform the coarse measurement using the first reference clock and the fine measurement using the shorter reference time. Thus, an accurate time measurement using the coarse measuring means and the fine measuring means can be accomplished within a short time.

Accordingly, when the time measuring apparatus or method of this invention is incorporated into a distance measuring apparatus or method, the laser diode emitting an electromagnetic wave for distance measurement will not be activated so frequently and therefore the laser diode will not be deteriorated hardly due to generated heat.

The time difference measured by the coarse measuring means is a duration from a change point (e.g., a leading edge or a trailing edge) of the first reference clock to the input time of measurement object pulse. The change point of the first reference clock can be arbitrarily set.

If the time difference measured by the coarse measuring means exceeds one period of the first reference clock, it will be necessary to reduce one period of the first reference clock when obtaining the correction time.

Accordingly, it is preferable that the time difference is measured based on a change point of the first reference clock closest to the input time of measurement object pulse.

The measured time difference can be directly used as the correction time of the approximate measurement object time. The calculating operation can be simplified.

It is also preferable that the reference time used to measure the time difference is a gate delay time of a gate circuit (more specifically, a delay time of a signal inherently caused when passing an inverter, an OR gate, an AND gate, or any other gate circuit) or a comparable short time.

The gate delay time of a gate circuit is dependent on performance characteristics of semiconductor elements constituting the gate circuit and is a very short time in the level of several nsec or less. Thus, using the gate delay time can realize a very accurate measurement of the time difference.

When the time measuring apparatus or method of this invention is incorporated into the above-described spectrum spread type distance measuring apparatus, it is preferable that a pulse train generated in accordance with a pseudo-random noise code is entered in synchronism with the first reference clock, the pulse train serving as the measurement object pulse. The input time of measurement object pulse is obtained based on a correlation value between the input pulse train and the pseudo-random noise code.

It is preferable to measure a time difference between a change point of the first reference clock and a change point of at least one pulse signal of the pulse train as the correction time of the approximate measurement object time.

In performing a spectrum spread type coarse measurement, the thus arranged coarse measuring means or the coarse measuring step makes it possible to accurately measure the measurement object time without receiving adverse influence of noise. This leads to improvement in the time resolution of finally obtained measurement time.

It is possible to measure the time difference between a change point of the first reference clock and a change point of only one pulse signal of the pulse train as the correction time of the approximate measurement object time.

However, regarding the pulse train produced in accordance with a PN code, a change point of each pulse signal is always unstable with respect to a change point of the first reference clock. Thus, the time difference between a change point of the first reference clock and a change point of a pulse signal fluctuates depending on circuit characteristics used in transmitting and receiving the pulse train or depending on environmental changes of a signal transmission path. This kind of fluctuation is called as jitter.

To suppress the adverse influence of jitter, it is preferable to successively measure each time difference between a change point of the first reference clock and a change point of each pulse signal of the pulse train, and obtain an average value of thus measured time differences as the correction time.

In this case, it is preferable to measure the time difference for each pulse signal of the pulse train based on a change point of the first reference clock closest to the change point of the pulse signal.

According to this apparatus or method, the time difference of each pulse signal is always shorter than one period of the first reference clock. Furthermore, the number of time counters required for measuring the time difference can be reduced to only one.

To this end, it is preferable that the fine measuring means comprises timer means for successively measuring a duration from a common reference time to a change point of each pulse signal of the pulse train and a duration from the common reference time to a change point of the first reference clock, and the fine measuring means calculates a time difference between neighboring change points of the pulse signal and the first reference clock based on measurement result by said timer means.

According to this arrangement, the timer means starts its counting operation from the common reference time and successively measures a count time in response to each change point of a signal to be measured. Thus, the time of each change point can be simply and accurately obtained without repetitively starting and stopping the timer means. Two change points used in calculating the time difference can be easily identified.

To count the gate delay time of a gate circuit, it is possible to use a time A/D conversion circuit disclosed in unexamined Japanese patent publication No. 3-220814.

The time A/D conversion circuit comprises a ring delay pulse generating circuit (i.e., so-called ring delay line, abbreviated as RGD hereinafter) which is constituted by a plurality of gate circuits (NAND circuits and/or inverters each having a constant gate delay time) connected in a ring pattern to circulate an input pulse in this circuit. A pulse selector detects the position of a pulse signal circulating in the RGD. An encoder converts the circulating position of the pulse signal detected by the pulse selector into digital data. A counter counts the frequency (i.e., the number of times) of revolutions of a pulse signal circulating in RGD, and produces an upper-bit data corresponding to the digital data (i.e., lower-bit data) obtained by the encoder. Accordingly, the time AID conversion circuit is a preferable timer means which counts the gate delay time (i.e., the reference time).

When the fine measuring means measures the time difference between a change point of each pulse signal of a pulse train and a change point of the first reference clock, each measured time difference deviates with respect to a true value. The distribution of time differences is a reverse V shape symmetrically spreading about the true value. The time difference offset far from the true value possibly includes a large error.

Accordingly, it is preferable to judge a distribution of change points of respective pulse signals of the pulse train in one period of the first reference clock and identify unnecessary pulse signals with reference to the distribution, and exclude time differences calculated based on unnecessary pulse signals from calculation of the average value.

With this arrangement or step, the correction time can be adequately calculated and accurate measurement of the measurement object time can be realized.

To judge the distribution of change points of respective pulse signals of the pulse train and identify the pulse signals unnecessary for the average value calculation, it is preferable to count the number of change points of respective pulse signals belonging to each of time-divisional areas constituting one period of the first reference clock, and identify the unnecessary pulse signals which belong to an area having a small count number.

More specifically, the fine measuring means comprises counting means for counting the number of change points of respective pulse signals belonging to each of four time-divisional areas constituting one period of the first reference clock. The fine measuring means calculates a difference Δ12 representing a difference between a count value of 1stMIN area and a count value of 2ndMIN area as well as a difference Δ23 representing a difference between a count value of 2ndMIN area and a count value of 3rdMIN area based on the count result of the counting means, wherein 1stMIN area has a smallest count value, 2ndMIN area has a next smallest count value, and 3rdMIN area has a third smallest count value.

The fine measuring means identifies the unnecessary pulses whose change points belong to the 1stMIN area when the difference Δ12 is larger than the difference Δ23, or identifies the unnecessary pulses whose change points belong to the 1stMIN area and the 2ndMIN area when the difference Δ12 is smaller than the difference Δ23, or identifies the unnecessary pulses whose change points belong to the 1stMIN area, the 2ndMIN area, and 3rdMIN area when the difference Δ12 is equal to the difference Δ23.

More specifically, when Δ12>Δ23, it is assumed that the number of change points of pulse signals belonging to 1stMIN area is extremely small compared with the number of change points of pulse signals belonging to other area. It is thus believed that many of change points of pulse signals spread in a wide range from 2ndMIN area to MAX area. And, it is concluded that the pulse signals having change points belonging to 1stMIN area are unnecessary for the average value calculation.

Furthermore, when Δ12<Δ23, it is assumed that the number of change points of pulse signals belonging to 1stMIN area and 2ndMIN area is extremely small compared with the number of change points of pulse signals belonging to 3rdMIN area. It is thus believed that many of change points of pulse signals spread in a range from 3rdMIN area to MAX area. And, it is concluded that the pulse signals having change points belonging to 1stMIN area and 2ndMIN area are unnecessary for the average value calculation.

Furthermore, when Δ12=Δ23, it is believed that many of change points of pulse signals reside in MAX area. Thus, it is concluded that the pulse signals having change points belonging to 1stMIN area, 2ndMIN area, and 3rdMIN area are unnecessary for the average value calculation.

With this arrangement or step, the correction time of the approximate measurement object time can be accurately measured.

In this case, it is further preferable that to invalidate all of calculated time differences and prohibit the calculation of the average value when the 3rdMIN area and MAX area are consecutive (i.e., neighboring) areas positioned before and after a change point of the reference clock used in the measurement of the time difference, wherein the MAX area has a largest count value.

When the 3rdMIN area and MAX area are consecutive (i.e., neighboring) areas positioned before and after a change point of the reference clock used in the measurement of the time difference, the reference clock used for obtaining the time differences of 3rdMIN area is different from the reference clock used for obtaining the time differences of MAX area. Thus, it is not preferable to calculate an average of the time differences obtained based on different reference clocks.

Furthermore, it is preferable that the time measuring apparatus further comprises second reference clock generating means for generating a second reference clock having a phase difference of 180 degrees with respect to the first reference clock. The fine measuring means comprises first fine measuring means for obtaining a first correction time which is an average time difference between a change point of each pulse signal and a change point of the first reference clock, second fine measuring means for obtaining a second correction time which is an average time difference between a change point of each pulse signal and a change point of the second reference clock, and correction time selecting means for judging whether a distribution of change points of respective pulses is closer to the change point of the first reference clock or closer to the change point of the second reference clock, and selecting the first correction time when the distribution of change points of respective pulses is closer to the change point of the second reference clock or selecting the second correction time when the distribution of change points of respective pulses is closer to the change point of the first reference clock.

With this arrangement, the fine measuring means can select a reliable correction time and appropriately correct the approximate measurement object time based on the selected reliable correction time.

According to this arrangement, the fine measuring means selects the second correction time when the distribution of change points of respective pulses is closer to the change point of the first reference clock. In this case, if the second correction time is directly used for correcting the approximate measurement object time measured based on the first reference clock by the coarse measuring means, the obtained result will deviate from an inherent value by an amount equivalent to a half period of the first reference clock.

Accordingly, when the second correction time is selected, it is necessary to add (or subtract) the time equivalent to a half period of the first reference clock to (or from) the corrected measurement object time.

The reference clock (i.e., second reference clock) used in the second fine measuring means is different from the reference clock (i.e., first reference clock) used in the first fine measuring means. In obtaining the measurement object time, the measuring accuracy may be lowered due to a variation of phase difference between the first reference clock and the second reference clock.

Hence, it is preferable that the coarse measuring means comprises first coarse measuring means for inputting the pulse train in synchronism with the first reference clock and measuring the approximate measurement object time based on a correlation value between the pulse train and the pseudo-random noise code, second coarse measuring means for inputting the pulse train in synchronism with the second reference clock and measuring the approximate measurement object time based on a correlation value between the pulse train and the pseudo-random noise code, and measurement time selecting means for selecting the approximate measurement object time of the first coarse measuring means when the correction time selecting means of the fine measuring means selects the first correction time or selecting the approximate measurement object time of the second coarse measuring means when the correction time selecting means of the fine measuring means selects the second correction time.

This arrangement always assures that the approximate measurement object time of the coarse measuring means and the correction time of the fine measuring means are obtained based on the same reference clock. Thus, it becomes possible to surely prevent the measuring accuracy from being lowered due to a variation of phase difference between two kinds of reference clocks.

When the fine measuring means is constituted by the first measuring means and the second measuring means, it is necessary to select one of two kinds of correction times. Therefore, it is preferable that the correction time selecting means is associated with counting means which counts the number of change points of respective pulse signals belonging to each of four time-divisional areas constituting one period of the first reference clock. The correction time selecting means compares the number of change points belonging to two consecutive areas positioned before and after the change point of the first reference clock with the number of change points belonging to two consecutive areas positioned before and after the change point of the second reference clock to identify one of the first and second reference clocks as having smaller change points, and selects the correction time measured based on the identified reference clock.

With this arrangement, the correction time selecting means can simply and surely select a reliable correction time for the approximate measurement object time obtained in the coarse measuring means.

In this case, it is preferable that the counting means uses the first reference clock, a first auxiliary clock having a phase difference of 90 degrees with respect to the first reference clock, the second reference clock having a phase difference of 180 degrees with respect to the first reference clock, and a second auxiliary clock having a phase difference of 270 degrees with respect to the first reference clock. The counting means identifies an area to which a change point of each pulse signal belongs based on a signal level of each clock at a change point of each pulse signal.

With this arrangement, in identifying the area to which a change point of each pulse signal belongs, the counting means can use a combination of signal levels of four kinds of clocks (i.e., a 4-bit data consisting of high or low data). Thus, the arrangement of the counting means can be simplified.

Meanwhile, the present invention provides a spectrum spread type distance measuring apparatus comprising pulse train generating means for generating a pulse train corresponding to a pseudo-random noise code having a predetermined bit length in synchronism with a reference clock, transmitting means for transmitting an electromagnetic wave modulated based on the pulse train generated by the pulse train generating means, receiving means for receiving a reflection wave reflected by a measurement object after the electromagnetic wave is transmitted from the transmitting means and for restoring the pulse train, time measuring means for measuring a measurement object time based on the pulse train restored by the receiving means and the pseudo-random noise code, the measurement object time representing a duration from transmission of the electromagnetic wave to reception of the reflection wave, and means for detecting a distance from the distance measuring apparatus to the measurement object based on the measurement object time measured by the time measuring means, wherein the time measuring means is the above-described time measuring apparatus of the present invention. Similarly, the time measuring method of the present invention is applicable to the spectrum spread type distance measuring apparatus.

According to this spectrum spread type distance measuring apparatus or method, the measurable distance resolution can be improved.

The spectrum spread type distance measuring apparatus of this invention can be preferably used as an obstacle detecting apparatus or an automatic tracking radar apparatus which is usually mounted on an automotive vehicle or a comparable mobile device and required to speedily and accurately detect the distance of an object (e.g., preceding vehicle) ahead of this vehicle.

In the spectrum spread type distance measuring apparatus, the receiving means is usually equipped with an antenna or a light-receiving element for receiving a reflection wave returning from a measurement object. By judging the magnitude of a received signal, the receiving means restores a pulse signal corresponding to a PN code. However, the level of a receiving signal is unstable immediately after starting the reception of a reflection wave. The pulse signal cannot be restored accurately.

If the pulse signal is not restored accurately and the pulse width of a restored pulse train does not correspond to the period of a reference clock, the time difference measured by the fine measuring means will largely deviate from a true value. It will be difficult to accurately correct the measurement object time.

Accordingly, it is preferable that the pulse train generating means generates surplus pulse signals for a predetermined time until an output of the receiving means is stabilized after the receiving means starts receiving the reflection wave, and then generates the pulse train corresponding to the pseudo-random noise code having a predetermined bit length in synchronism with a reference clock. And, the time measuring means starts time measurement after the predetermined time has elapsed after the transmitting means starts transmission of the electromagnetic wave based on the pulse signal generated by the pulse train generating means.

With this arrangement, the coarse measuring means and the fine measuring means can start the time measuring operation after the operation of the receiving means is stabilized adequately.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENT

A preferred embodiment of the present invention will be explained hereinafter with reference to attached drawings.

Figure 1:
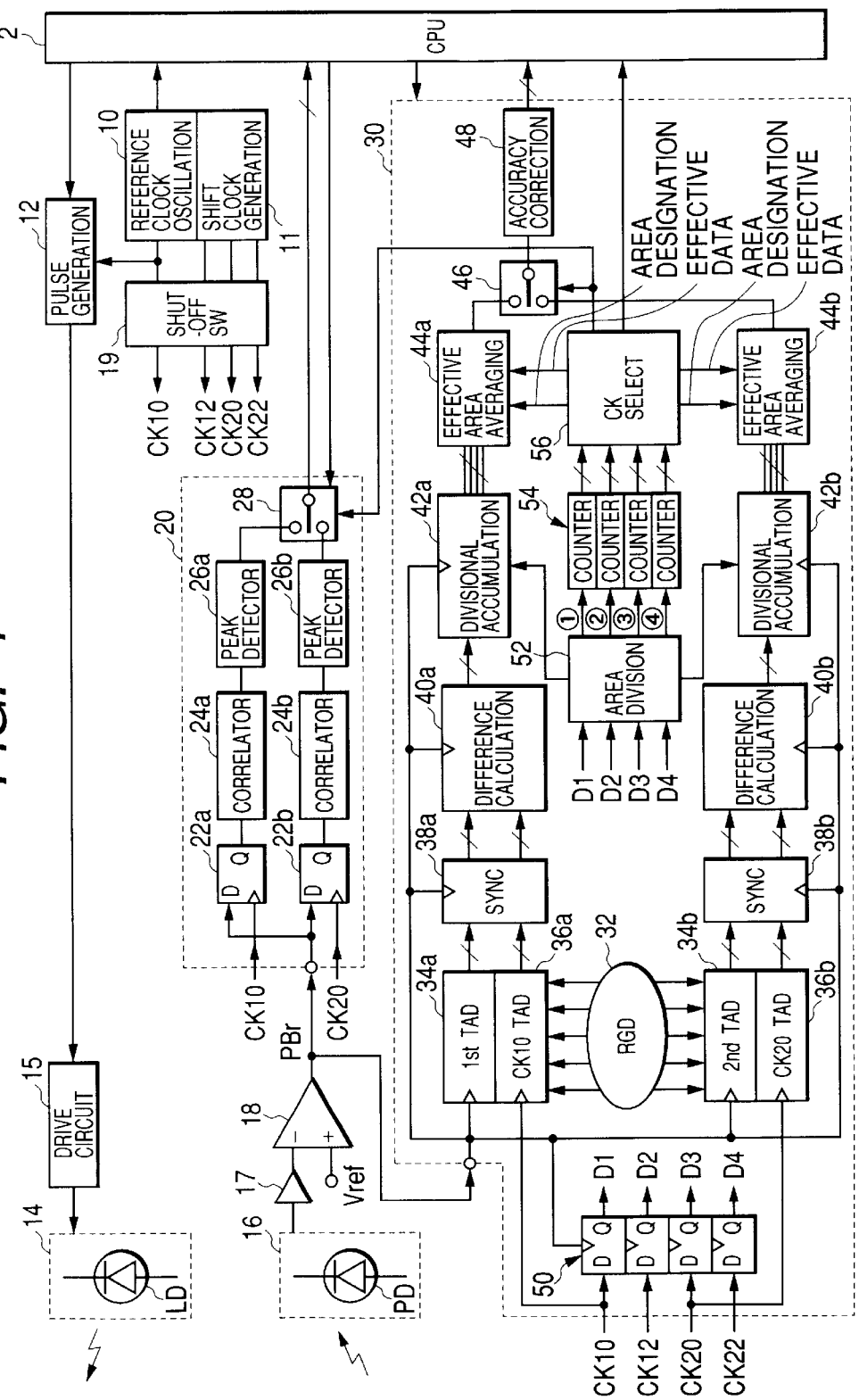
FIG. 1 is a schematic diagram showing an overall arrangement of a distance measuring system in accordance with a preferred embodiment of the present invention.

FIG. 1 shows the arrangement of a spectrum spread type distance measuring system in accordance with a preferred embodiment of the present invention.

For example, the distance measuring system of this embodiment can be installed on an automotive vehicle (hereinafter, referred to as system own vehicle) and is applicable to measure a distance from the system own vehicle to a preceding vehicle.

As shown in FIG. 1, reference clock oscillator 10 generates first reference clock CK10 having a predetermined frequency (e.g., 20 MHz). Pulse generator 12 generates a pulse signal corresponding to a PN code (e.g., M-sequences pseudo-random code) having a predetermined bit length (e.g., 10 to 99 bits) in synchronism with first reference clock CK10. In accordance with the pulse signal generated by pulse generator 12, light emitting device 14 emits a laser beam forward to measure a distance from the system own vehicle to a preceding object. In this respect, the laser beam serves as a distance measuring electromagnetic wave.

Light emitting device 14 is equipped with laser diode LD serving as a light emitting element. Drive circuit 15, receiving the light-emitting pulse signal from pulse generator 12, activates and deactivates laser diode LD to emit a laser beam corresponding to the PN code.

Pulse generator 12 receives the PN code from a microcomputer (hereinafter, referred to as CPU) 2 in synchronism with first reference clock CK10. Pulse generator 12 generates the light-emitting pulse according to the PN code.

When a measurement object ahead of the system own vehicle reflects the laser beam emitted from light emitting device 14, light receiving device 16 receives the reflection light. Amplifier 17 amplifies the reflection light received by light receiving device 16. Comparator 18 compares the amplified light-receiving signal with a predetermined reference voltage Vref and generates a light-receiving pulse PBr. The light-receiving pulse PBr becomes a high level signal when the light-receiving signal is larger than the reference voltage Vref and becomes a low level signal when the light-receiving signal is not larger than the reference voltage Vref.

Light receiving device 16 is equipped with photo diode PD. Photo diode PD is connected to a power source line via a current-detecting resistance and is kept in a reverse bias condition. Light receiving device 16 detects a voltage value proportional to a photocurrent flowing across photo diode PD when the laser beam (i.e., reflection light returning from the measurement object) enters into photo diode PD.

Pulse generator 12 serves as pulse train generating means of the present invention. Drive circuit 15 and light emitting device 14 cooperatively serve as transmitting means of the present invention. Light receiving device 16, amplifier 17, and comparator 18 cooperatively serve as receiving means of the present invention.

Shift clock generator 11 generates three kinds of clock signals, i.e., second reference clock CK20, first auxiliary clock CK 12, and second auxiliary clock CK22, based on first reference clock CK10 generated from reference clock oscillator 10 serving as first reference clock generating means. Second reference clock CK20 has a phase difference of 180 degrees with respect to first reference clock CK10. First auxiliary clock CK12 has a phase difference of 90 degrees with respect to first reference clock CK10. First auxiliary clock CK12 is delayed by 90 degrees with respect to first reference clock CK10. Second auxiliary clock CK22 has a phase difference of 270 degrees with respect to first reference clock CK10. In other words, second auxiliary clock CK22 is delayed by 90 degrees with respect to second reference clock CK20.

Coarse measuring circuit 20 receives first reference clock CK10, second reference clock CK20, and light-receiving pulse PBr. Fine measuring circuit 30 receives first reference clock CK10, second reference clock CK20, first auxiliary clock CK12, second auxiliary clock CK22, and light-receiving pulse PBr.

Shutoff switch 19, selectively permitting or blocking the transmission of respective clocks CK10, CK12, CK20, and CK22, is interposed in the signal transmission path extending from reference clock oscillator 10 and shift clock generator 11 to coarse measuring circuit 20 and fine measuring circuit 30. CPU 2 controls the open-or-close condition of shutoff switch 19. In other words, each of clocks CK10, CK12, CK20 and CK22 can be supplied to respective measuring circuits 20 and 30 only when shutoff switch 19 is activated.

Provision of shutoff switch 19 allows CPU 2 to control start and stop of operations of respective measuring circuits 20 and 30.

Each of measuring circuits 20 and 30 operates in the following manner.

Coarse measuring circuit 20 comprises a first coarse measuring circuit consisting of D flip flop (hereinafter, referred to as DFF) 22a, correlator 24a, and peak detector 26a. DFF 22a latches light-receiving pulse PBr at each leading edge (i.e., a change point) of first reference clock CK10. Correlator 24a receives light-receiving pulse PBr (more specifically, its signal level) successively latched by DFF 22a in synchronism with first reference clock CK10. Then, correlator 24a calculates a correlation value between the pulse train of received light-receiving pulse PBr and the PN code used by pulse generator 12 to generate the light-emitting pulse. Peak detector 26a detects a maximum correlation value calculated by correlator 24a and identifies the time corresponding to the maximum correlation value as receiving time of reflection light. Then, peak detector 26a obtains a duration (i.e., time interval) from the measurement start time to the light receiving time of the reflection light.

The measurement start time is an operation start time of coarse measuring circuit 20 which starts receiving light-receiving pulse PBr in response to first reference clock CK10 sent via shutoff switch 19 under the control of CPU 2.

In the measurement of distance, CPU 2 causes pulse generator 12 to generate a pulse signal corresponding to the PN code. The light emitting device 14 emits a laser beam for distance measurement. At the same time, CPU 2 activates (opens) shutoff switch 19 so that each clock can be entered into respective measuring circuits 20 and 30. The measurement start time of coarse measuring circuit 20 corresponds to a timing (i.e., time t0 shown in FIG. 2) at which light emitting device 14 starts emitting the laser beam corresponding to the PN code.

Figure 2:
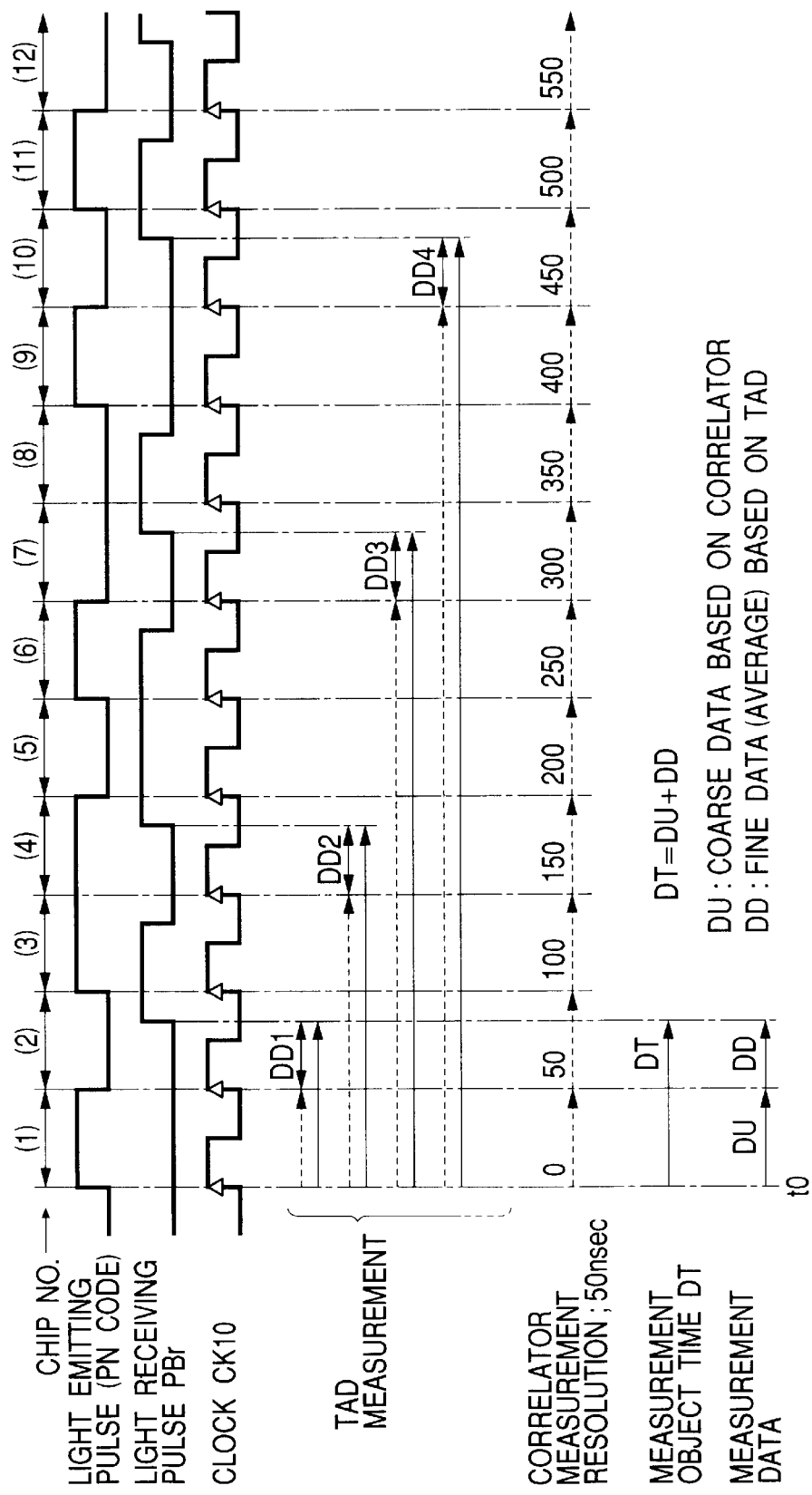
FIG. 2 is a time chart explaining a measuring operation performed by the distance measuring system in accordance with the preferred embodiment of the present invention.

As shown in FIG. 2, after light emitting device 14 started emitting the laser beam at timing t0, the laser beam hits the measurement object ahead of the system own vehicle. Then, the laser beam reflected from the measurement object is received by light receiving device 16. Then, comparator 18 outputs light-receiving pulse PBr corresponding to the reflection light. Coarse measuring circuit 20 measures the duration (i.e., time interval) from the emission of laser beam (t0) to the output of light-receiving pulse PBr. In other words, coarse measuring circuit 20 measures a trip time (i.e., go-and-return time) of the laser beam. In this case, coarse measuring circuit 20 has a time resolution equivalent to one period of the first reference clock CK10.

In FIG. 2, the clock frequency of first reference clock CK10 is 20 MHz. In this case, coarse measuring circuit 20 has the time resolution equivalent to 50 nsec. Thus, coarse measuring circuit 20 using correlator 24a can perform the measurement at timings of 50 nsec, 100 nsec, 150 nsec, . . . .

Prior to generation of the pulse signal corresponding to the PN code, pulse generator 12 generates surplus signals. Then, CPU 2 causes pulse generator 12 to generate the pulse signal corresponding to the PN code and activates (opens) shutoff switch 19.

This is effective to suppress DC fluctuation of the receiving signal of amplifier 17 before coarse measuring circuit 20 starts the time measuring operation.

Namely, according to the SS type distance measuring system, a coupling capacitor or a high-pass filter is provided in an input/output path of the light-receiving signal of amplifier 17 so that comparator 18 can accurately restore the pulse train corresponding to the PN code. Only the high-frequency signal components can pass through the coupling capacitor or the high-pass filter. Of the light-receiving signal sent from light receiving device 16, amplifier 17 amplifies only the high-frequency components varying according to the PN code. Comparator 18 compares the amplified light-receiving signal with the reference voltage Vref to accurately restore the pulse train.

However, according to amplifier 17 having such an arrangement, immediately after the light-receiving signal corresponding to the reflection light is entered from light receiving device 16, the reference voltage (i.e., fluctuation center of light-receiving signal) temporarily becomes higher than the ground potential. Then, the reference voltage gradually decreases and stabilizes at the ground potential. In such a transient region (i.e., DC fluctuation region), comparator 18 cannot accurately restore the pulse signal. If an inaccurate pulse signal is used in the time measurement, it will be difficult to accurately detect a measurement object time for the distance measurement.

In view of this problem, the distance measuring system of this embodiment causes pulse generator 12 to generate pulse signals continuously until the output (i.e., DC fluctuation) of amplifier 17 stabilizes sufficiently before generating the pulse signal corresponding to the PN code. After the output of amplifier 17 stabilizes, the time measuring operation can be started based on the light-emitting pulse according to the PN code. Comparator 18 can restore the light-receiving pulse train corresponding to the PN code. Then, a correlation between the restored light-receiving pulse train and the PN code is obtained. Thus, the time required for transmitting and receiving the laser beam can be accurately measured based on the correlation value.

In addition to the above-described first coarse measuring circuit (22a, 24a, 26a), coarse measuring circuit 20 comprises a second coarse measuring circuit consisting of DFF 22b, correlator 24b, and peak detector 26b.

DFF 22b latches light-receiving pulse PBr at each leading edge (i.e., a change point) of second reference clock CK20. Correlator 24b receives light-receiving pulse PBr (more specifically, its signal level) successively latched by DFF 22b in synchronism with second reference clock CK20. Then, correlator 24b calculates a correlation value between the pulse train of received light-receiving pulse PBr and the PN code. Peak detector 26b detects a maximum correlation value calculated by correlator 24b and identifies the time corresponding to the maximum correlation value as a light receiving time of the reflection light. Then, peak detector 26b obtains a duration (i.e., time interval) from the measurement start time to the light receiving time of the reflection light.

The second coarse measuring circuit is thus functionally equivalent to the first coarse measuring circuit, but is different in that the duration (i.e., time interval) for the time measurement or distance measurement is calculated based on second reference clock CK20. Coarse measuring circuit 20 has changeover switch 28 for selectively outputting the measurement result of the first coarse measuring circuit or the measurement result of the second coarse measuring circuit. The measurement result selected by changeover switch 28 is sent to CPU 2.

According to this embodiment, the measurement result obtained by coarse measuring circuit 20 is compared with the measurement result obtained by fine measuring circuit 30. To this end, fine measuring circuit 30 performs a first time measurement (i.e., first fine measurement) in response to a leading edge (i.e., build-up or rise edge) of first reference clock CK10 and a second time measurement (i.e., second fine measurement) in response to a leading edge (i.e., build-up or rise edge) of second reference clock CK20. Fine measuring circuit 30 compares two measurement results thus obtained and selectively outputs only one measurement result having higher measuring accuracy. The selected measurement result is sent to CPU 2.

In this respect, coarse measuring circuit 20 performs a first time measurement (i.e., first coarse measurement) in response to a leading edge of first reference clock CK10 and a second time measurement (i.e., second coarse measurement) in response to a leading edge of second reference clock CK20.

Accordingly, CPU 2 receives first and second coarse measurement results from coarse measuring circuit 20 as well as first and second fine measurement results from fine measuring circuit 30.

The measurement result of the second measuring circuit is obtained with reference to a leading edge of second reference clock CK2. In other words, measurement result of the second measuring circuit is in a delayed relationship with respect to an actual time by an amount equivalent to a half period of reference clock CK10, CK20. Peak detector 26b (or CPU 2) corrects the time error (delay) of the measurement result.

Changeover switch 28, serving as measurement time selecting means of the present invention, selects a measurement result to be sent to CPU 2 in accordance with a switching signal fed from fine measuring circuit 30. Thus, according to this embodiment, the position of changeover switch 28 is changed in response to a switching signal supplied from fine measuring circuit 30. CPU 2 receives the measurement result of coarse measuring circuit 20 and related measurement result of fine measuring circuit 30 which are measured based on the same reference clock.

Fine measuring circuit 30 uses A/D converting circuit (hereinafter, referred to as TAD) which converts the time into a digital data by utilizing a gate delay time of a gate circuit. Fine measuring circuit 30 calculates a time difference between the change point (i.e., leading edge) of first reference clock CK10 and the change point (i.e., leading edge) of light-receiving pule PBr. The measured time difference is used as a correction time for the measurement time obtained in coarse measuring circuit 20.

The time resolution of coarse measuring circuit 20 is equivalent to one period of first reference clock CK10.

When the clock frequency is 20 MHz, the time resolution of coarse measuring circuit 20 is 50 nsec. Fine measuring circuit 30 measures time differences DD1, DD2, - - - , each representing the difference between a leading edge of each light-receiving pulse PBr and a leading edge of an immediately preceding first reference clock CK10, as shown in FIG. 2. Time differences DD1, DD2, - - - are measured with reference to the gate delay time serving as reference time. Then, an average value of measured time differences DD1, DD2, - - - is obtained as correction time (i.e., fine data DD) for correcting the measurement result (i.e., coarse data DU) of coarse measuring circuit 20.

The operation of fine measuring circuit 30 allows CPU 2 to correct the measurement time of coarse measuring circuit 20 based on the correction time (i.e., fine data DD) obtained by fine measuring circuit 30. CPU 2 obtains a measurement object time DT (=DU+DD) for the distance measurement whose time resolution is equivalent to the gate delay time.

Fine measuring circuit 30 comprises a first fine measuring circuit and a second fine measuring circuit. The first fine measuring circuit measures a time difference between a leading edge of first reference clock CK10 and a leading edge of succeeding light-receiving pulse PBr. The second fine measuring circuit measures a time difference between a leading edge of second reference clock CK20 and a leading edge of succeeding light-receiving pulse PBr.

Fine measuring circuit 30 has CK selector 56 which identifies a correction time having a higher accuracy between the average values of time differences measured by the first and second fine measuring circuits. Select switch 46 selectively outputs the correction time to CPU 2 in response to the selection result of CK selector 56. Accuracy corrector 48, provided in the signal path extending from select switch 46 to CPU 2, further corrects the correction time based on an ambient temperature or the like.

The purpose of providing accuracy corrector 48 is to eliminate adverse influence of the temperature characteristics of TAD used in the measurement of correction time, thereby assuring the accuracy of correction time (i.e., fine data DD) sent from fine measuring circuit 30 to CPU 2.

TAD used in the measurement of correction time converts the time into digital data by utilizing the gate delay time of the gate circuit. The gate delay time varies depending on an operation temperature of the gate circuit. Thus, fine measuring circuit 30 employs accuracy corrector 48 to compensate a measurement error of correction time resulting from the temperature change.

The first fine measuring circuit comprises 1stTAD 34a, CK10TAD 36a, synchronizer 38a, difference calculator 40a, divisional accumulator 42a, and effective area averaging section 44a. 1stTAD 34a successively measures a rise (or build-up) time of each light-receiving pulse PBr by utilizing ring delay line (RGD) 32. RGD 32 comprises a plurality of gate circuits (NAND circuits and/or inverters each having a constant gate delay time) which are connected in a predetermined ring pattern. CK10TAD 36a successively measures a rise (or build-up) time of each first reference clock CK10 by utilizing RGD 32. Synchronizer 38a latches the latest time data obtained in respective TADs 34a and 36a at leading edges of light-receiving pulse PBr. Difference calculator 40a calculates a difference between the rise time of first reference clock CK10 and the rise time of light-receiving pulse PBr based on the time data entered from synchronizer 38a. Divisional accumulator 42a accumulates the time difference calculated by difference calculator 40a for respective areas. Area divider 52 identifies an area to which each leading edge of light-receiving pulse PBr belongs. Among accumulated values of respective areas obtained by divisional accumulator 42a, effective area averaging section 44a calculates an average value of the accumulated values of an effective area designated by CK selector 56.

The second fine measuring circuit comprises 2ndTAD 34b, CK20TAD 36b, synchronizer 38b, difference calculator 40b, divisional accumulator 42b, and effective area averaging section 44b. 2ndTAD 34b successively measures a rise time of each light-receiving pulse PBr by utilizing RGD 32. CK20TAD 36b successively measures a rise time of each second reference clock CK20 by utilizing RGD 32. Synchronizer 38b latches the latest time data obtained in respective TADs 34b and 36b at leading edges of light-receiving pulse PBr. Difference calculator 40b calculates a difference between the rise time of second reference clock CK20 and the rise time of light-receiving pulse PBr based on the time data entered from synchronizer 38b. Divisional accumulator 42b accumulates the time difference calculated by difference calculator 40b for respective areas. Area divider 52 identifies an area to which each leading edge of light-receiving pulse PBr belongs. Among accumulated values of respective areas obtained by divisional accumulator 42b, effective area averaging section 44b calculates an average value of the accumulated values of an effective area designated by CK selector 56.

Each of TDA 34a, 36a, 34b, and 36b comprises a counter for counting the frequency (i.e., the number of times) of revolutions of a pulse signal circulating in RGD 32, a pulse selector for detecting the position of the pulse circulating in RGD 32 at a leading edge of an objective signal (i.e., light-receiving pulse PBr, first reference clock CK10, or second reference clock CK20), and an encoder for converting the position of the pulse signal detected by the pulse selector into digital data. Each of TDA 34a, 36a, 24b, and 36b outputs rise timing data of a time measuring object which consists of upper-bit data representing the count value of the counter and lower-bit data representing the detection result of the encoder.

Each of TDA 34a, 36a, 34b, and 36b, each serving as timer means of the present invention, has a time resolution equivalent to a gate delay time (several nsec. or less) shorter than the period (50 nsec.) of the reference clock.

In addition to the first and second fine measuring circuits, fine measuring circuit 30 comprises latch section 50, area divider 52, frequency counter 54, and CK selector 56.

Figure 3:
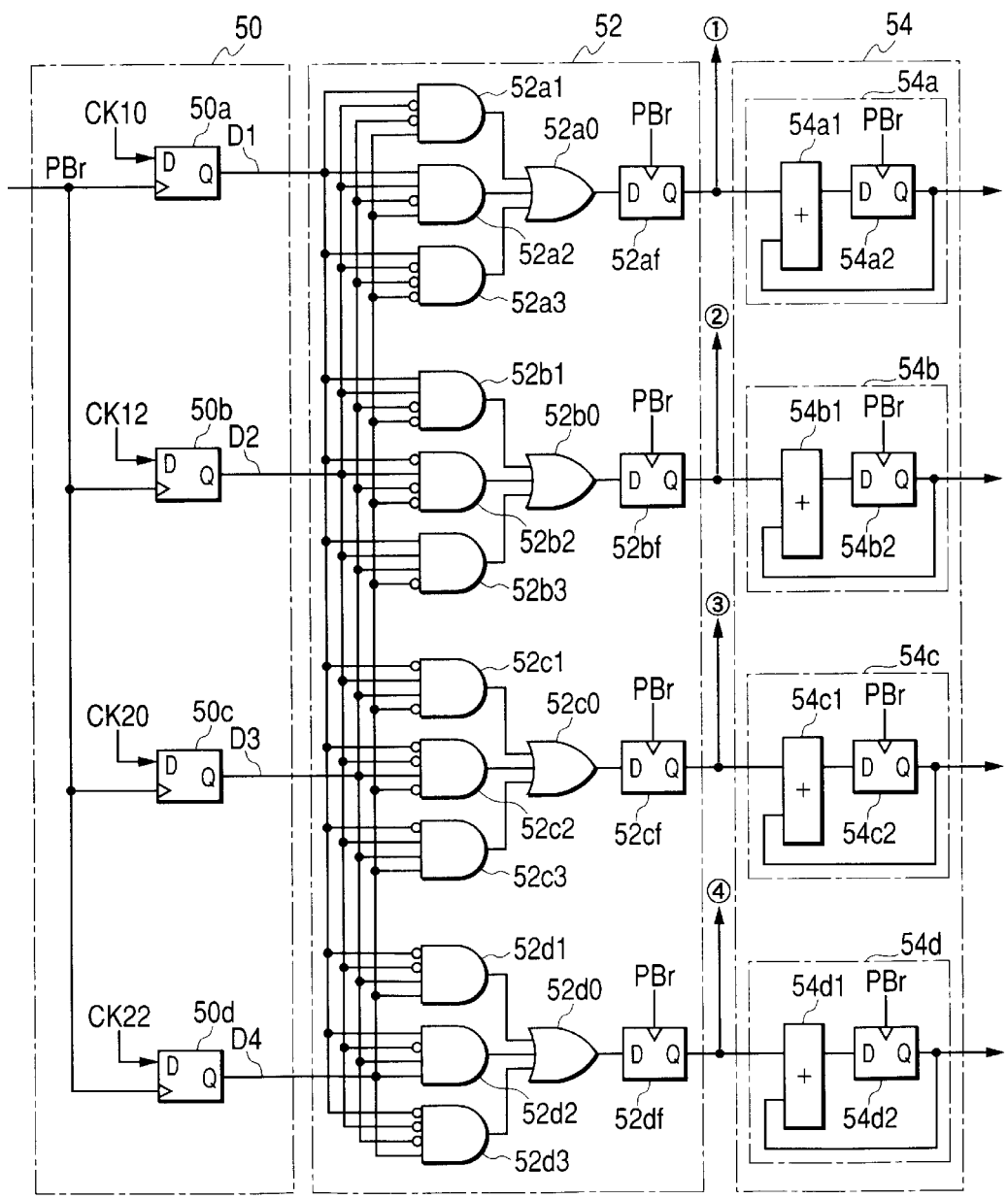
FIG. 3 is a detailed circuit diagram showing a latch section, an area divider, and a frequency counter of a fine measuring circuit of the distance measuring system in accordance with the preferred embodiment of the present invention.

As shown in FIG. 3, latch section 50 comprises DFF 50a, DFF 50b, DFF 50c and DFF 50d. DFF 50a latches first reference clock CK10 at a leading edge of light-receiving pulse PBr. DFF 50b latches first auxiliary clock CK12 at a leading edge of light-receiving pulse PBr. DFF 50c latches second reference clock CK20 at a leading edge of light-receiving pulse PBr. And, DFF 50d latches second auxiliary clock CK22 at a leading edge of light-receiving pulse PBr. The outputs D1 to D4 of respective DFF 50a to 50d are output as 4-bit data representing the position of the leading edge of light-receiving pulse PBr with respect to first reference clock CK10.

Based on the 4-bit data (D1, D2, D3, and D4) of latch section 50, area divider 52 identifies an area to which the leading edge of light-receiving pulse PBr belongs among four divided areas ① to ④. The four divided areas ① to ④ correspond to four time-divisional sections of one period (50 nsec.) of first reference clock CK10 (refer to FIG. 4). Then, area divider 52 outputs a high-level signal from a signal line corresponding to the identified area. FIG. 3 shows the detailed arrangement of area divider 52.

Figure 4:
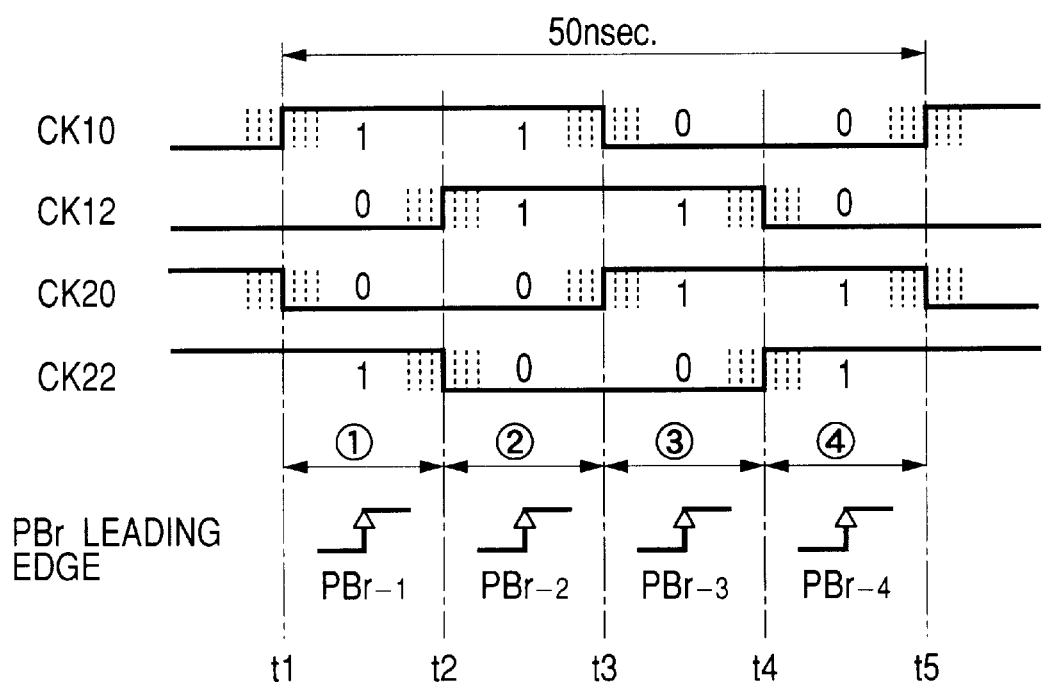
FIG. 4 is a time chart explaining an operation of the are divider of the fine measuring circuit of the distance measuring system in accordance with the preferred embodiment of the present invention.

More specifically, as shown in FIG. 4, first area ① ranges from a leading edge (t1) of first reference clock CK10 to a leading edge (t2) of first auxiliary clock CK12. Second area ②, succeeding first area ①, ranges from the leading edge (t2) of first auxiliary clock CK12 to a leading edge (t3) of second reference clock CK20. Third area ③, succeeding second area ②, ranges from the leading edge (t3) of second reference clock CK20 to a leading edge (t4) of second auxiliary clock CK22. Fourth area ④, succeeding third area ③, ranges from the leading edge (t4) of second auxiliary clock CK22 to the next leading edge (t5) of first reference clock CK10.

4-bit data of '1001' is produced from latch section 50 when the leading edge of light-receiving pulse PBr belongs to first area ①. 4-bit data of '1100' is produced from latch section 50 when the leading edge of light-receiving pulse PBr belongs to second area ②. 4-bit data of '0110' is produced from latch section 50 when the leading edge of light-receiving pulse PBr belongs to third area ③. 4-bit data of '0011' is produced from latch section 50 when the leading edge of light-receiving pulse PBr belongs to fourth area ④.

Area divider 52 comprises four AND circuits 52a1, 52b1, 52c1, and 52d1 each having four (inverting or non-inverting) input terminals. AND circuits 52a1 produces a high-level output in response to 4-bit data of '1001' when produced from latch section 50. AND circuit 52b1 produces a high-level output in response to 4-bit data of '1100' when produced from latch section 50. AND circuit 52c1 produces a high-level output in response to 4-bit data of '0110' when produced from latch section 50. AND circuit 52d1 produces a high-level output in response to 4-bit data of '0011' when produced from latch section 50.

Latch circuits 52af, 52bf, 52cf, and 52df latch the outputs of AND circuits 52a1, 52b1, 52c1, and 52d1, respectively. Each of latch circuits 52af, 52bf, 52cf, and 52df is a DFF operating in response to a leading edge of light-receiving pulse PBr. Outputs of latch circuits 52af, 52bf, 52cf, and 52df are sent to frequency counter 54.

The relationship between leading edges of light-receiving pulse PBr and first to fourth areas ① to ④ are basically dependent on the above-described four kinds of data values produced from latch section 50. However, actual four-bit data produced from latch section 50 may deviate from the above-described four kinds of data values due to the fluctuation of edges of clocks CK10, CK12, CK20, and CK22 (refer to dotted lines in FIG. 4).

In view of this problem, area divider 52 has the following characteristic arrangement so that the area to which a leading edge of light-receiving pulse PBr belongs can be surely identified regardless of fluctuation of the edges of clocks CK10, CK12, CK20, and CK22.

More specifically, AND circuit 52a1 is combined with two AND circuits 52a2, 52a3 and one OR circuit 52a0. AND circuit 52a2 produces a high-level signal in response to 4-bit data of '1101' when produced from latch section 50. AND circuit 52a3 produces a high-level signal in response to 4-bit data of '1000' when produced from latch section 50. OR circuit 52a0 sends the outputs of three AND circuits 52a1, 52a2, 52a3 to latch circuit 52af. AND circuit 52b1 is combined with two AND circuits 52b2, 52b3 and one OR circuit 52b0. AND circuit 52b2 produces a high-level signal in response to 4-bit data of '0100' when produced from latch section 50. AND circuit 52b3 produces a high-level signal in response to 4-bit data of '1110' when produced from latch section 50. OR circuit 52b0 sends the outputs of three AND circuits 52b1, 52b2, 52b3 to latch circuit 52bf.

Similarly, AND circuit 52c1 is combined with two AND circuits 52c2, 52c3 and one OR circuit 52c0. AND circuit 52c2 produces a high-level signal in response to 4-bit data of '0010' when produced from latch section 50. AND circuit 52c3 produces a high-level signal in response to 4-bit data of '0111' when produced from latch section 50. OR circuit 52c0 sends the outputs of three AND circuits 52c1, 52c2, 52c3 to latch circuit 52cf. AND circuit 52d1 is combined with two AND circuits 52d2, 52d3 and one OR circuit 52d0. AND circuit 52d2 produces a high-level signal in response to 4-bit data of '1011' when produced from latch section 50. AND circuit 52d3 produces a high-level signal in response to 4-bit data of '0001' when produced from latch section 50. OR circuit 52d0 sends the outputs of three AND circuits 52d1, 52d2, 52d3 to latch circuit 52df.

As a result, in response to a leading edge of light-receiving pulse PBr, one of four signal lines connected to frequency counter 54 becomes high level when corresponding to an area (①, ②, ③, or ④) to which the leading edge of light-receiving pulse PBr belongs. The remaining three signal lines become low level.

Accordingly, with reference to signal levels of the four kinds of signals lines, frequency counter 54 can accurately identify one of four areas ① to ④ as the area to which the leading edge of light-receiving pulse PBr belongs.

Frequency counter 54 counts the rise or build-up frequency (i.e., the number of times) of light-receiving pulse PBr for each of first to fourth areas ① to ④. As shown in FIG. 3, frequency counter 54 consists of four kinds of counters 54a, 54b, 54c, and 54d which are connected to area divider 52 via the four signal lines.

Counter 54a consists of adder 54a1 and latch circuit 54a2. Adder 54a1 adds the output (1-bit data of 0 or 1) of area divider 52 (i.e., latch circuit 52af) and the output of latch circuit 54a2 at each leading edge of light-receiving pulse PBr. Latch circuit 54a2 latches the output of adder 54a1 in response to a leading edge of light-receiving pulse PBr. Counter 54b consists of adder 54b1 and latch circuit 54b2. Adder 54b1 adds the output (1-bit data of 0 or 1) of area divider 52 (i.e., latch circuit 52bf) and the output of latch circuit 54b2 at each leading edge of light-receiving pulse PBr. Latch circuit 54b2 latches the output of adder 54b1 in response to a leading edge of light-receiving pulse PBr.

Similarly, counter 54c consists of adder 54c1 and latch circuit 54c2. Adder 54c1 adds the output (1-bit data of 0 or 1) of area divider 52 (i.e., latch circuit 52cf) and the output of latch circuit 54c2 at each leading edge of light-receiving pulse PBr. Latch circuit 54c2 latches the output of adder 54c1 in response to a leading edge of light-receiving pulse PBr. Counter 54d consists of adder 54d1 and latch circuit 54d2. Adder 54d1 adds the output (1-bit data of 0 or 1) of area divider 52 (i.e., latch circuit 52df) and the output of latch circuit 54d2 at each leading edge of light-receiving pulse PBr. Latch circuit 54d2 latches the output of adder 54d1 in response to a leading edge of light-receiving pulse PBr.

Frequency counter 54 counts the frequency (i.e., the number of times) of incoming leading edges for each of four areas ① to ④ in response to every leading edge of light-receiving pulse PBr, after starting the operation of fine measuring circuit 30.

The output of area divider 52 is sent not only to frequency counter 54 but also to divisional accumulators 42a and 42b. Divisional accumulator 42a accumulates the time difference calculated by difference calculator 40a based on the output of area divider 52 for each of four areas ① to ④ to which light-receiving pulse PBr belongs. Similarly, divisional accumulator 42b accumulates the time difference calculated by difference calculator 40b based on the output of area divider 52 for each of four areas ① to ④ to which light-receiving pulse PBr belongs.

Area divider 52 is responsive to each leading edge of light-receiving pulse PBr. This will cause a significant time lag (delay) when the information (representing the area to which light-receiving pulse PBr belongs) is transmitted from area divider 52 to each of divisional accumulators 42a and 42b. This time lag (delay) is equivalent to a duration (time interval) between two consecutive leading edges of light-receiving pulse PBr. The data representing a time difference between a leading edge of first reference clock CK10 and a leading edge of light-receiving pulse PBr is entered into divisional accumulator 42a via synchronizer 38a and difference calculator 40a which operate at each leading edge of light-receiving pulse PBr. Similarly, the data representing a time difference between a leading edge of second reference clock CK20 and a leading edge of light-receiving pulse PBr is entered into divisional accumulator 42b via synchronizer 38b and difference calculator 40b which operate at each leading edge of light-receiving pulse PBr. In other words, transmission of time difference data is performed with a time lag (delay) equivalent to a duration (time interval) between two consecutive leading edges of light-receiving pulse PBr. Thus, each of divisional accumulators 42a and 42b can receive the information representing the area to which light-receiving pulse PBr belongs before inputting the corresponding time difference data. Accordingly, the time difference sorting operation performed in each of divisional accumulators 42a and 42b is accurately synchronized with the area judging operation of area divider 52.

In this embodiment, latch section 50, area divider 52, and frequency counter 54 cooperatively serve as counting means of the present invention.

CK selector 56 serves as correction time selecting means of the present invention. More specifically, CK selector 56 chooses preferable accumulation values and excludes inadequate accumulation values among the time difference accumulation values of respective areas ① to ④ accumulated in each of divisional accumulators 42a and 42b, for calculating an average value (i.e., correction time) in each of effective area averaging sections 44a and 44b. Then, CK selector 56 compares two average values obtained by respective effective area averaging sections 44a and 44b and selects one of two average values which has higher accuracy. Then, CK selector 56 changes the position of select switch 46 in accordance with the selection result. At the same time, CK selector 56 sends a switching signal to changeover switch 28 provided in coarse measuring circuit 20. Thus, the switching operation of changeover switch 28 is performed in such a manner that the measurement time (i.e., coarse data DU) sent from coarse measuring circuit 20 to CPU 2 and the correction time (i.e., fine data DD) sent from fine measuring circuit 30 to CPU 2 via select switch 46 and accuracy corrector 48 are based on the same reference clock CK10 or CK20.

Figure 5:
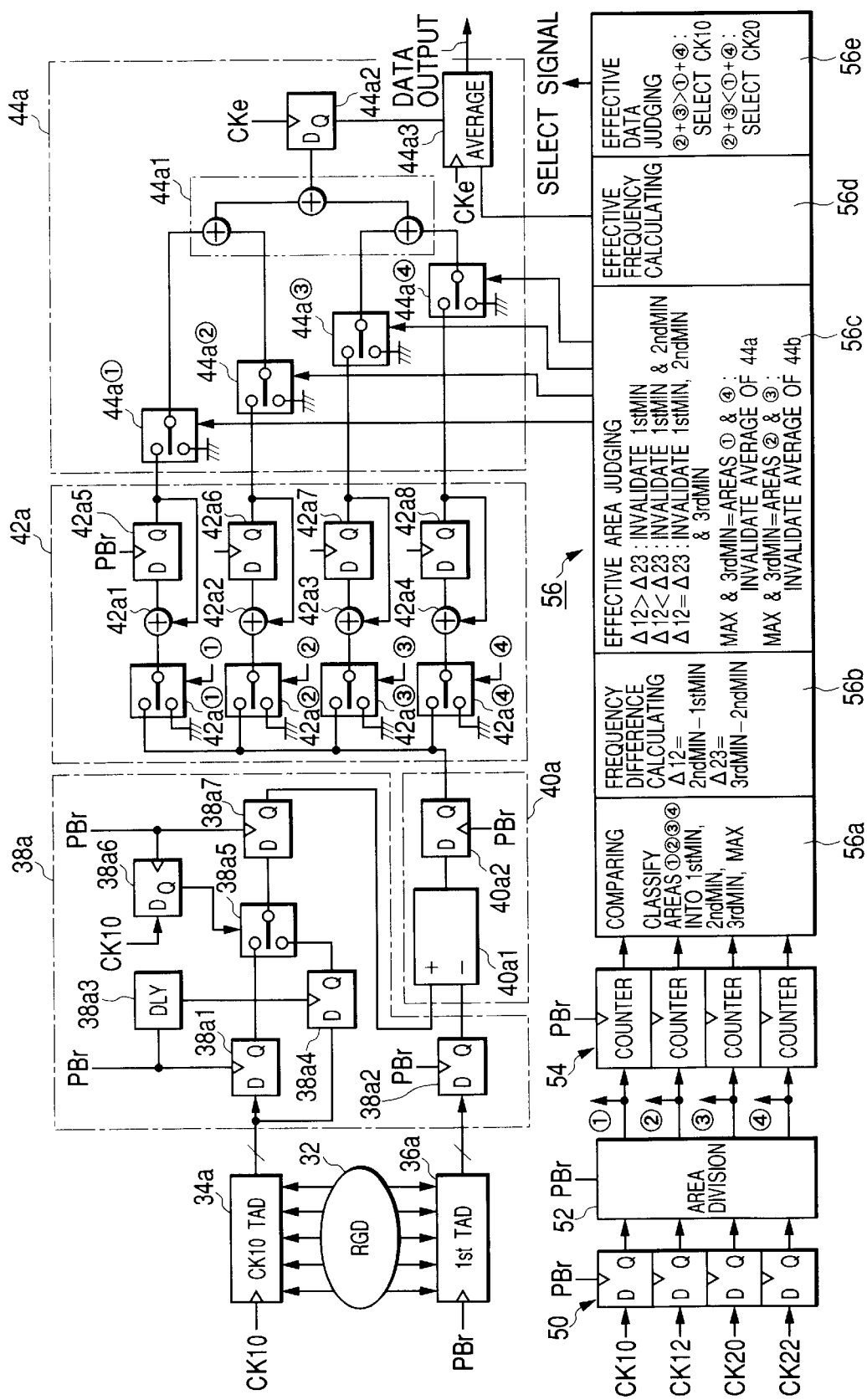
FIG. 5 is a detailed circuit diagram showing a CK selector, a synchronizer, a divisional accumulator, and an effective area averaging section of the fine measuring circuit of the distance measuring system in accordance with the preferred embodiment of the present invention.

FIG. 5 shows a detailed arrangement of CK selector 56. As shown in FIG. 5, CK selector 56 consists of comparing section 56a, frequency difference calculating section 56b, effective area judging section 56c, effective frequency calculating section 56d, and effective data judging section 56e.

Needless to say, all of the sections 56a, 56b, 56c, 56d and 56e can be replaced by programed computation processing of a microcomputer or by a logic circuit or any other dedicated operational circuit.

In CK selector 56, comparing section 56a compares the leading edge count values of light-receiving pulse PBr in respective areas ① to ④ counted by frequency counter 54. Then, based on comparison result, comparing section 56a designates the area having the smallest count value as 1stMIN area, the area having the next smallest count value as 2ndMIN area, the area having the third smallest count value as 3rdMIN area, and the area having the largest count value as MAX area.

Frequency difference calculating section 56b calculates a difference Δ12 between the count value of 1stMIN area and the count value of 2ndMIN area (Δ12=2ndMIN−1stMIN) as well as a difference Δ23 between the count value of 2ndMIN area and the count value of 3rdMIN area (Δ23=3rdMIN−2ndMIN).

Effective area judging section 56c chooses effective areas and excludes inadequate areas among the above-described four areas ① to ④ based on the count value differences Δ12 and Δ23 obtained by frequency difference calculating section 56b for the average value calculation in effective area averaging sections 44a and 44b.

More specifically, when Δ12>Δ23, it is assumed that the number of leading edges of light-receiving pulse PBr belonging to 1stMIN area is extremely small compared with the number of leading edges of light-receiving pulse PBr belonging to other area. It is thus believed that many of leading edges of light-receiving pulse PBr spread in a wide range from 2ndMIN area to MAX area. Thus, effective area judging section 56c concludes that the time difference accumulation value corresponding to 1stMIN area is inadequate, and accordingly prevents the accumulation values corresponding to 1stMIN area from being used for obtaining an average value in each of effective area averaging sections 44a and 44b.

Furthermore, when Δ12<Δ23, it is assumed that the number of leading edges of light-receiving pulse PBr belonging to 1stMIN area and 2ndMIN area is extremely small compared with the number of leading edges of light-receiving pulse PBr belonging to 3rdMIN area. It is thus believed that many of leading edges of light-receiving pulse PBr spread in a range from 3rdMIN area to MAX area. Thus, effective area judging section 56c concludes that time difference accumulation values corresponding to 1stMIN area and 2ndMIN area are inadequate, and accordingly prevents the accumulation values corresponding to 1stMIN area and 2ndMIN area from being used for obtaining an average value in each of effective area averaging sections 44a and 44b.

Furthermore, when Δ12=Δ23, it is believed that many of leading edges of light-receiving pulse PBr reside in MAX area. Thus, effective area judging section 56c concludes that time difference accumulation values corresponding to 1stMIN area, 2ndMIN area, and 3rdMIN area are inadequate, and accordingly prevents the accumulation values corresponding to 1stMIN area, 2ndMIN area, and 3rdMIN area from being used for obtaining an average value in each of effective area averaging sections 44a and 44b.

The following is the reason why effective area judging section 56c operates as described above.

The position of a leading edge of light-receiving pulse PBr responsive to a leading edge of reference clock CK10 or CK20 may fluctuate due to jitter noise. The distribution of leading edges of light-receiving pulse PBr is a reverse V shape symmetrically spreading about a true value. The time difference obtained based on a leading edge of light-receiving pulse PBr offset far from the true value possibly includes a large error.

Thus, effective area judging section 56c identifies one or more areas having erroneous time differences with reference to count values of respective areas obtained in frequency counter 54. The time difference accumulation values in the identified areas are excluded from the calculation of an average value (i.e., correction time) in each of effective area averaging sections 44a and 44b.

The above-described operation of effective area judging section 56c effectively eliminates calculation errors in obtaining an average value in cases where the calculated time difference includes an error equivalent to one period of reference clock CK10 or CK20 due to a so-called folding phenomenon wherein leading edges of light-receiving pulse PBr spread about a leading edge of first reference clock CK10 or second reference clock CK20.

More specifically, when MAX area and 3rdMIN area are consecutively positioned before and after a leading edge of first reference clock CK10 (i.e., areas ④ and ① shown in FIG. 6), effective area judging section 56c invalidates the time measurement by the first fine measuring circuit (including 1stTAD 34a, CK10TAD 36a, synchronizer 38a, difference calculator 40a, divisional accumulator 42a, and effective area averaging section 44a). Thus, effective area judging section 56c prevents effective area averaging section 44a from receiving the accumulated values obtained based on the leading edge of first reference clock CK10. On the other hand, when MAX area and 3rdMIN area are consecutively positioned before and after a leading edge of second reference clock CK20 (i.e., areas ② and ③ shown in FIG. 6), effective area judging section 56c invalidates the time measurement by the second fine measuring circuit (including 2ndTAD 34b, CK20TAD 36b, synchronizer 38b, difference calculator 40b, divisional accumulator 42b, and effective area averaging section 44b). Thus, effective area judging section 56c prevents effective area averaging section 44a from receiving the accumulated values obtained based on the leading edge of second reference clock CK20.

When MAX area and 3rdMIN area are consecutively positioned before and after a leading edge of the reference clock to be used for time difference calculation (i.e., first reference clock CK10 or second reference clock CK20), the above-described folding phenomenon will appear. Part of the obtained time differences will be the ones measured based on a reference clock different from the reference clock to be used for the time difference calculation. If such erroneously obtained time differences are used to calculate an average value, it will be difficult to obtain an accurate correction time.

For example, when the distribution of light-receiving pulse PBr spread as shown in FIG. 6(a) or FIG. 6(f), the relationship Δ12<Δ23 is established. In this case, an average time difference value is calculated based on accumulation values corresponding to 3rdMIN area and MAX area. According to the distribution shown in FIG. 6(a) or FIG. 6(f), MAX area and 3rdMIN area are consecutive areas ② and ③ positioned before and after a leading edge of the second reference clock CK20. The second reference clock CK20 used for the time difference calculation in area ② is different from the second reference clock CK20 used for the time difference calculation in area ③.

Furthermore, when the distribution of light-receiving pulse PBr spreads as shown in FIG. 6(c), the relationship Δ12<Δ23 is established. In this case, an average time difference value is calculated based on accumulation values corresponding to 3rdMIN area and MAX area. According to the distribution shown in FIG. 6(c), MAX area and 3rdMIN area are consecutive areas ④ and ① positioned before and after a leading edge of the first reference clock CK10. The first reference clock CK10 used for the time difference calculation in area ① is different from the first reference clock CK10 used for the time difference calculation in area ④.

In this manner, MAX area and 3rdMIN area straddle the reference clock serving as a time difference measuring criteria (i.e., first reference clock CK10 or second reference clock CK20). According to such folding phenomenon, accumulation values calculated in respective areas include errors corresponding to one period of the reference clock. If such accumulation values including error components are used in obtaining an average time difference, it will be difficult to obtain an accurate correction time.

Hence, when MAX area and 3rdMIN area are consecutively positioned before and after a leading edge of the reference clock CK10 or CK20, effective area judging section 56c invalidates the operation of the measuring circuit responsive to the corresponding reference clock CK10 or CK20. Thus, this embodiment eliminates the problems derived from folding phenomenon.

Figure 6:
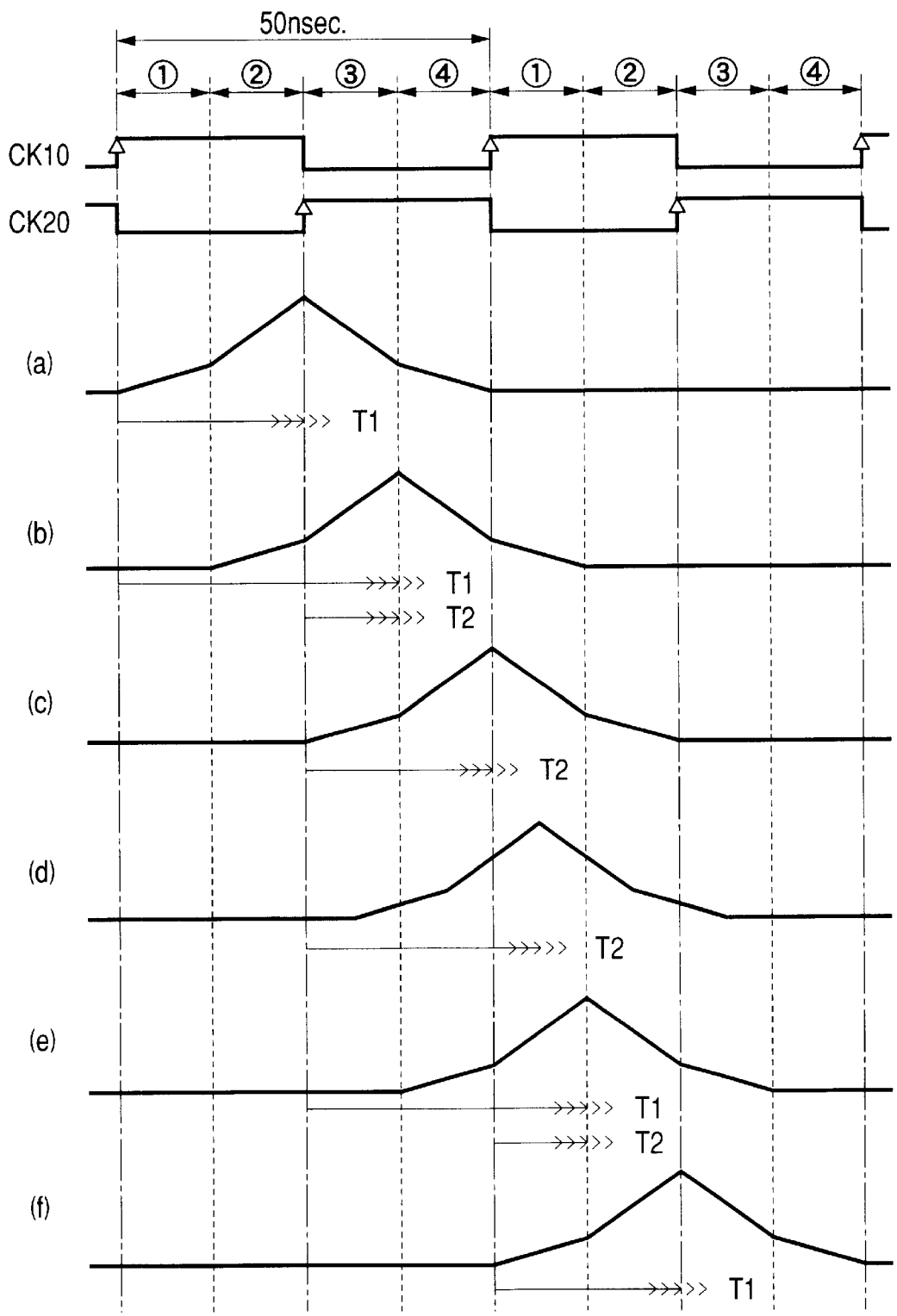
FIG. 6 is a time chart explaining an operation of the CK selector of the fine measuring circuit of the distance measuring system in accordance with the preferred embodiment of the present invention.

As a result, when the distribution of light-receiving pulse PBr spreads as shown in FIG. 6(a) or FIG. 6(f), only the time differences (i.e., T1 shown in FIG. 6) measured in areas ② and ③ based on first reference clock CK10 are regarded as valid data. Thus, fine measuring circuit 30 validates only the effective area averaging section 44a to calculate a correction value. On the contrary, when the distribution of light-receiving pulse PBr spreads as shown in FIG. 6(c), only the time differences (i.e., T2 shown in FIG. 6) measured in areas ④ and ① based on second reference clock CK20 are regarded as valid data. Thus, fine measuring circuit 30 validates only the effective area averaging section 44b to calculate a correction value. In this manner, fine measuring circuit 30 effectively prevents CPU 2 from receiving an erroneous correction value.

Next, based on judgement result (i.e., effective areas) in effective area judging section 56c, effective frequency calculating section 56d inputs only the count values of the effective areas among the four kinds of count values (corresponding to four areas ① to ④) obtained in frequency counter 54. Then, the effective frequency calculating section 56d causes each of effective area averaging sections 44a and 44b to obtain an average value based on only the count values of the effective areas.

Next, effective data judging section 56e calculates a first sum ①+④ representing the count values corresponding to areas ① and ④ positioned before and after a leading edge of first reference clock CK10, and also calculates a second sum ②+③ representing the count values corresponding to areas ② and ③ positioned before and after a leading edge of second reference clock CK20. Then, effective data judging section 56e compares the first sum ①+④ with the second sum ②+③.

When the first sum ①+④ is smaller than the second sum ②+③ (i.e., ①+④<②+③), it is judged that the correction time obtained based on first reference clock CK10 in the first fine measuring circuit (34a, 36a, 38a, 40a, 42a, 44a) is more accurate than the correction time obtained based on second reference clock CK20 in the second fine measuring circuit. Thus, a select signal designating the output of effective area averaging section 44a is sent to select switch 46 from effective data judging section 56e. At the same time, a select signal designating the output of peak detector 26a is sent to changeover switch 28 from effective data judging section 56e. Accordingly, the measurement time data based on first reference clock CK10 are simultaneously sent to CPU 2 from coarse measuring circuit 20 and fine measuring circuit 30.

On the contrary, when the first sum ①+④ is larger than the second sum ②+③ (i.e., ①+④>②+③), it is judged that the correction time obtained based on second reference clock CK20 in the second fine measuring circuit (34b, 36b, 38b, 40b, 42b, 44b) is more accurate than the correction time obtained based on first reference clock CK10 in the first fine measuring circuit. Thus, a select signal designating the output of effective area averaging section 44b is sent to select switch 46 from effective data judging section 56e. At the same time, a select signal designating the output of peak detector 26b is sent to changeover switch 28 from effective data judging section 56e. Accordingly, the measurement time data based on second reference clock CK20 are simultaneously sent to CPU 2 from coarse measuring circuit 20 and fine measuring circuit 30.

The following is the reason why effective data judging section 56e operates in the above-described manner.

When MAX area and 3rdMIN area are consecutively positioned before and after a leading edge of reference clock CK10 or CK20, the correction time measured based on this reference clock CK10 or CK20 is invalidated by the operation of effective area judging section 56c. When MAX area and 3rdMIN area are not consecutively positioned before and after a leading edge of reference clock CK10 or CK20, two kinds of correction times are calculated based on first and second reference clocks CK10 and CK20 in the first and second fine measuring circuits. One of two correction times is selected and sent to CPU 2 as correction time (i.e., fine data DD).

In selecting an optimum one of two correction times, the following points should be taken into consideration.

When the distribution of light-receiving pulse PBr centers on the boundary between areas ③ and ④ as shown in FIG. 6(b), or when the distribution of light-receiving pulse PBr centers on the boundary between areas ① and ② as shown in FIG. 6(e), the relationship Δ12<Δ23 is established. All the time difference accumulation values corresponding to 1stMIN area and 2ndMIN area are excluded from the calculation of an average value. In this case, there is no substantial difference between selecting a correction time based on time difference (T1 shown in FIG. 6) measured based on first reference clock CK10 and selecting a correction time based on time difference (T2 shown in FIG. 6) measured based on second reference clock CK20. In other words, no adverse influence of the above-described folding phenomenon appears.

However, when the distribution of light-receiving pulse PBr centers on the midpoint of area ① as shown in FIG. 6(d), the relationship Δ12>Δ23 is established. Only the time difference accumulation values corresponding to 1stMIN area (area ③) are excluded. And, an average value is calculated based on time difference values measured based on first reference clock CK in the remaining effective areas (areas ①, ②, and ④). However, the time difference values measured in area ④ or the time difference values measured in areas ① and ④ are subjected to the above-described folding phenomenon. Therefore, it becomes difficult to accurately measure a correction time.

In view of the above, the effective data judging section 56e performs in the above-described manner to select a correction time derived from the time difference (T2 shown in FIG. 6) measured based on second reference clock CK20.

Accordingly, fine measuring circuit 30 can select an optimum one of two correction times measured in two kinds of fine measuring circuits. In this respect, a correction time selected by fine measuring circuit 30 is very close to the true value. This makes it possible for CPU2 to accurately measure the distance from the system own vehicle to a measurement object based on accurate time data, i.e., the measurement time (i.e., coarse data DU) obtained in coarse measuring circuit 20 and correction time (i.e., fine data DD) obtained in fine measuring circuit 30.

FIG. 5 shows a detailed arrangement of first fine measuring circuit comprising synchronizer 38a, difference calculator 40a, divisional accumulator 42a, and effective area averaging section 44a which is substantially identical with that of second fine measuring circuit comprising synchronizer 38b, difference calculator 40b, divisional accumulator 42b, and effective area averaging section 44b.

As shown in FIG. 5, synchronizer 38a comprises a latch circuit 38a1 which latches an output (i.e., clock edge time data) of CK10TAD 34a at a leading edge of light-receiving pulse PBr and a latch circuit 38a2 which latches an output (i.e., light-receiving pulse edge time data) of 1stTAD 36a at a leading edge of light-receiving pulse PBr.

Furthermore, synchronizer 38a comprises a delay circuit (DLY) 38a3 which delays light-receiving pulse PBr by a predetermined time (e.g., half period of first reference clock CK10) shorter than one period of first reference clock CK10. A latch circuit 38a4 is activated in response to a leading edge of light-receiving pulse PBr passing through delay circuit 38a3. The output (i.e., clock edge time data) of CK10TAD 34a is latched by the latch circuit 38a4 at a leading edge of light-receiving pulse PBr.

The light-receiving pulse edge time data, latched by latch circuit 38a2, is directly sent to difference calculator 40a. The clock edge time data latched by latch circuits 38a1 and 38a4 are respectively sent to select switch 38a5 provided in this synchronizer 38a.

Select switch 38a5 is responsive to an output of latch circuit (e.g., DFF) 38a6 which latches first reference clock CK10 at a leading edge of light-receiving pulse PBr. When latch circuit 38a6 outputs a high-level signal, select switch 38a5 selects the clock edge time data latched by latch circuit 38a4. When latch circuit 38a6 outputs a low-level signal, select switch 38a5 selects the clock edge time data latched by latch circuit 38a1.

The clock edge time data selected by select switch 38a5 is latched by latch circuit 38a7 which is activated in response to a leading edge of light-receiving pulse PBr. Difference calculator 40a receives the clock edge time data latched by latch circuit 38a7.

Synchronizer 38a receives the light-receiving pulse edge time data measured by 1stTAD 36a and latches it at the next leading edge of light-receiving pulse PBr. The time data thus latched is sent to difference calculator 40a.

Difference calculator 40a successively measures time differences DD1, DD2, - - - , each representing a duration (i.e., time interval) between a leading edge of light-receiving pulse PBr and a leading edge of immediately preceding reference clock CK10, as described previously. To this end, synchronizer 38a comprises latch circuit 38a1 latching clock edge time data of CK10TDA 34a at a leading edge of light-receiving pulse PBr and latch circuit 38a7 latching the output of latch circuit 38a1 at the next leading edge of light-receiving pulse PBr.

However, an output of time A/D converting circuit (i.e., TAD) is unstable immediately after an input of an objective signal but becomes stable after elapse of a predetermined delay time. If synchronizer 38a is constituted by only three latch circuits (i.e., latch circuit 38a2 latching the light-receiving pulse edge time data, and two latch circuits 38a1 and 38a7 latching the clock edge time data), it will be difficult to accurately latch the clock edge time data when a time difference between a leading edge of light-receiving pulse PBr and a leading edge of first reference clock CK10 is small. The time difference calculated in difference calculator 40a will include a significant error.

In view of the above, synchronizer 38a has delay circuit 38a3, latch circuit 38a4, select switch 38a5, and latch circuit 38a6, in addition to the above-described three latch circuits (38a1, 38a2, 38a7). When the signal level of first reference clock CK10 latched by latch circuit 38a6 is high (i.e., when light-receiving pulse PBr rises within the time equivalent to a half period of first reference clock CK10 since a rise of first reference clock CK10), the output of CK10TAD 34a may be unstable. Thus, select switch 38a5 selects the clock edge time data latched by latch circuit 38a4 at a delayed timing later than the rise of light-receiving pulse PBr. Otherwise, select switch 38a5 selects the clock edge time data latched by latch circuit 38a1.

Hence, synchronizer 38a can accurately latch the time data corresponding to a leading edge of light-receiving pulse PBr as well as time data corresponding to an immediately preceding leading edge of first reference clock CK10. These time data are simultaneously output to difference calculator 40a.

Accordingly, difference calculator 40a can accurately obtain a time difference between a leading edge of light-receiving pulse PBr and a leading edge of first reference clock CK10 based on the time data (i.e., clock edge time data and light-receiving pulse edge time data) received from synchronizer 38a.

As shown in FIG. 5, difference calculator 40a consists of subtraction circuit 40a1 and latch circuit 40a2. Subtraction circuit 40a1 subtracts the clock edge time data from the light-receiving pulse edge time data. Latch circuit 40a2 latches the output (i.e., time difference data) of subtraction circuit 40a1 at a leading edge of first reference clock CK10. The time difference data latched by latch circuit 40a2 is sent to divisional accumulator 42a.

Divisional accumulator 42a comprises four select switches 42a①, 42a②, 42a③, 42a④, four adders 42a1, 42a2, 42a3, 42a4, and four latch circuits 42a42a6, 42a7, 42a8. Each of select switches 42a① to 42a④ selectively inputs the time difference data sent from difference calculator 40a in response to a high-level signal ①, ②, ③, or ④ sent from area divider 52. High-level signals ① to ④ respectively represent an area to which a leading edge of light-receiving pulse PBr belongs. Each of adders 42a1 to 42a4 accumulates time difference data selectively received by associated select switch 42a①, 42a②, 42a③, or 42a④. Each of latch circuits 42a5 to 42a8 latches the output (i.e., accumulation data) of corresponding adder 42a1, 42a2, 42a3, or 42a4 at a leading edge of light-receiving pulse PBr. Each accumulation data latched by latch circuits 42a5, 42a6, 42a7, and 42a8 is sent to effective area averaging section 44a and also fed back to corresponding adder 42a1, 42a2, 42a3, or 42a4.

Accordingly, after area divider 52 identifies the area (i.e., ①, ②, ③, or ④) to which an incoming leading edge of light-receiving pulse PBr belongs, the output of difference calculator 40a is input to corresponding adder 42a1, 42a2, 42a3, or 42a4 via select switch 42a①, 42a②, 42a③, or 42a④. Each of adders 42a1, 42a2, 42a3, and 42a4 accumulates the output (i.e., time difference data) entered from difference calculator 40a. The accumulated values of adders 42a1, 42a2, 42a3, and 42a4 are sent to effective area averaging section 44a via associated latch circuits 42a5, 42a6, 42a7, and 42a8, respectively.

Effective area averaging section 44a comprises four select switches 44a①, 44a②, 44a③, and 44a④ for inputting the accumulation values of areas ①, ②, ③, and ④ from divisional accumulator 42a. These select switches 44a①, 44a②, 44a③, and 44a④ selectively input the accumulation values corresponding to effective areas which are judged to be effective for average calculation (i.e., correction time calculation) by effective area judging section 56c. To this end, to position of respective select switch 44a①, 44a②, 44a③, and 44a④ is changed in accordance with an output (i.e., judgement result) of effective area judging section 56c.

Adder 44a1 adds the accumulation values entered through select switch 44a①, 44a②, 44a③, and 44a④. Latch circuit 44a2 latches the added result (i.e., data) of adder 44a1 at a leading edge of operation termination clock CKe.

Average calculating circuit 44a3 inputs the output (i.e., added result of adder 44a1) from latch circuit 44a2 in response to a leading edge of operation termination clock CKe. Average calculating circuit 44a3 divides the added result of adder 44a1 by the effective frequency obtained by effective frequency calculating section 56d, thereby obtaining an average value of time differences based on the data corresponding to only the effective areas judged by effective area judging section 56c. The obtained average value, serving as correction time data (i.e., fine data DD), is sent to select switch 46.

Accordingly, effective area averaging section 44a calculates an average value of time differences (each time difference representing a leading edge of first reference clock CK10 and a leading edge of light-receiving pulse PBr) based on only the accumulation values corresponding to the effective areas which are effective for the average calculation as judged by effective area judging section 56c.

As described above, according to the distance measuring system of this embodiment, coarse measuring circuit 20 having a time resolution equivalent to one period of reference clock CK10 obtains approximate measurement object time DU (i.e., time data to be obtained for distance measurement). Fine measuring circuit 30, having a time resolution equivalent to the gate delay time of a gate circuit, obtains an error component of the measurement time (i.e, correction time). CPU 2 receives the approximate measurement object time DU from coarse measuring circuit 20 and also receives the correction time DD from fine measuring circuit 30.

The distance measuring system of this embodiment requires only one distance measuring operation for thoroughly performing an accurate time measurement realized by coarse measuring circuit 20 and fine measuring circuit 30. Thus, the distance measuring system of this embodiment can reduce the activation frequency (i.e., the number of times) of laser diode LD constituting light emitting device 14, and therefore effectively prevents laser diode LD from deteriorating due to excessive heat generation.

Furthermore, according to this embodiment, shift clock generator 11 produces second reference clock CK20 having a phase difference of 180 degrees with respect to first reference clock CK10. The coarse measurement and the fine measurement are performed by using two kinds of reference clocks CK10 and CK20. Accordingly, the measurement time of coarse measuring circuit 20 can be accurately corrected by using the correction time of fine measuring circuit 30.

CK selector 56 selects accurate correction times among the correction times measured based on first and second reference clocks CK10 and CK20. In accordance with selection result of CK selector 56, coarse measuring circuit 20 selects the measurement time corresponding to the same reference clock as that of correction times selected by CK selector 56.

According to the distance measuring system of this embodiment, fine measuring circuit 30 can accurately measure a correction time. CPU 2 can simply and accurately measure the distance from a system own vehicle to an object based on the measurement time of coarse measuring circuit 20 and the correction time of fine measuring circuit 30.

The present invention is not limited to the disclosed embodiment and therefore can be variously modified.

For example, the distance measuring system of the present invention can be used as time measuring apparatus for simply measuring a duration (i.e., time interval) from arbitrary measurement start time to input of a pulse signal or pulse train.

It is also preferable that coarse measuring circuit 20 performs the time measurement based on only first reference clock CK10 provided that the phase difference between first and second reference clocks CK10 and CK20 is accurately maintained to 180 degrees.

This invention may be embodied in several forms without departing from the spirit of essential characteristics thereof. The present embodiment as described is therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A time measuring apparatus, comprising:
   first reference clock generating means for generating a first reference clock at predetermined periods;
   coarse measuring means for measuring an approximate measurement object time based on said first reference clock, said approximate measurement object time representing a duration from a measurement start time to an input time of measurement object pulse; and
   fine measuring means, cooperating with said coarse measuring means and using a reference time of predetermined periods shorter than those of said first reference clock, for measuring a time difference between a change point of said first reference clock and the input time of measurement object pulse as a correction time of said approximate measurement object time, thereby obtaining a precise measurement object time,
   wherein a precise measurement object time is obtained based on said approximate measurement object time measured by said coarse measuring means and said correction time measured by said fine measuring means.

2. The time measuring apparatus in accordance with claim 1, wherein said fine measuring means measures said time difference based on a change point of said first reference clock closest to the input time of measurement object pulse.

3. The time measuring apparatus in accordance with claim 1, wherein said reference time used by said fine measuring means is a gate delay time of a gate circuit.

4. The time measuring apparatus in accordance with claim 1, wherein
   said coarse measuring means is a spectrum spread type measuring device which inputs a pulse train generated in accordance with a pseudo-random noise code in synchronism with said first reference clock, said pulse train serving as said measurement object pulse, and obtains the input time of measurement object pulse based on a correlation value between said pulse train and said pseudo-random noise code, and measures the approximate measurement object time representing a duration from the measurement start time to the input time of measurement object pulse, and
   said fine measuring means measures a time difference between a change point of said first reference clock and a change point of at least one pulse signal of said pulse train as said correction time of said approximate measurement object time.

5. The time measuring apparatus in accordance with claim 4, wherein said fine measuring means successively measures each time difference between a change point of said first reference clock and a change point of each pulse signal of said pulse train, and obtains an average value of thus measured time differences as said correction time.

6. The time measuring apparatus in accordance with claim 5, wherein said fine measuring means measures said time difference for each pulse signal of said pulse train based on a change point of said first reference clock closest to the change point of said pulse signal.

7. The time measuring apparatus in accordance with claim 6, wherein said fine measuring means comprises timer means for successively measuring a duration from a common reference time to a change point of each pulse signal of said pulse train and a duration from the common reference time to a change point of said first reference clock, and said fine measuring means calculates a time difference between neighboring change points of said pulse signal and said first reference clock based on measurement result by said timer means.

8. The time measuring apparatus in accordance with claim 5, wherein said fine measuring means judges a distribution of change points of respective pulse signals of said pulse train in one period of said first reference clock and identifies unnecessary pulse signals with reference to said distribution, and excludes time differences calculated based on unnecessary pulse signals from calculation of said average value.

9. The time measuring apparatus in accordance with claim 8, wherein said fine measuring means counts the number of change points of respective pulse signals belonging to each of time-divisional areas constituting one period of said first reference clock, and identifies said unnecessary pulse signals which belong to an area having a small count number.

10. The time measuring apparatus in accordance with claim 9, wherein said fine measuring means comprises counting means for counting the number of change points of respective pulse signals belonging to each of four time-divisional areas constituting one period of said first reference clock,
   said fine measuring means calculates a difference $\Delta 12$ representing a difference between a count value of 1stMIN area and a count value of 2ndMIN area as well as a difference $\Delta 23$ representing a difference between a count value of 2ndMIN area and a count value of 3rdMIN area based on count result of said counting means, wherein 1stMIN area has a smallest count value, 2ndMIN area has a next smallest count value, and 3rdMIN area has a third smallest count value, said fine measuring means identifies the unnecessary pulses whose change points belong to said 1stMIN area when the difference Δ12 is larger than the difference Δ23, or identifies the unnecessary pulses whose change points belong to said 1stMIN area and said 2ndMIN area when the difference Δ12 is smaller than the difference Δ23, or identifies the unnecessary pulses whose change points belong to said 1stMIN area, said 2ndMIN area, and 3rdMIN area when the difference Δ12 is equal to the difference Δ23.

11. The time measuring apparatus in accordance with claim 10, wherein said fine measuring means invalidates all of calculated time differences and prohibits the calculation of said average value when said 3rdMIN area and MAX area are consecutive areas positioned before and after a change point of the reference clock used in the measurement of said time difference, wherein said MAX area has a largest count value.

12. The time measuring apparatus in accordance with claim 5, further comprising second reference clock generating means for generating a second reference clock having a phase difference of 180 degrees with respect to said first reference clock, wherein said fine measuring means comprises:
  first fine measuring means for obtaining a first correction time which is an average time difference between a change point of each pulse signal and a change point of said first reference clock;
  second fine measuring means for obtaining a second correction time which is an average time difference between a change point of each pulse signal and a change point of said second reference clock; and
  correction time selecting means for judging whether a distribution of change points of respective pulses is closer to the change point of said first reference clock or closer to the change point of said second reference clock, and selecting said first correction time when said distribution of change points of respective pulses is closer to the change point of said second reference clock or selecting said second correction time when said distribution of change points of respective pulses is closer to the change point of said first reference clock.

13. The time measuring apparatus in accordance with claim 12, wherein said coarse measuring means comprises:
  first coarse measuring means for inputting said pulse train in synchronism with said first reference clock and measuring said approximate measurement object time based on a correlation value between said pulse train and said pseudo-random noise code;
  second coarse measuring means for inputting said pulse train in synchronism with said second reference clock and measuring said approximate measurement object time based on a correlation value between said pulse train and said pseudo-random noise code; and
  measurement time selecting means for selecting the approximate measurement object time of said first coarse measuring means when said correction time selecting means of said fine measuring means selects said first correction time or selecting the approximate measurement object time of said second coarse measuring means when said correction time selecting means of said fine measuring means selects said second correction time.

14. The time measuring apparatus in accordance with claim 12, wherein said correction time selecting means is associated with counting means which counts the number of change points of respective pulse signals belonging to each of four time-divisional areas constituting one period of said first reference clock, said correction time selecting means compares the number of change points belonging to two consecutive areas positioned before and after the change point of said first reference clock with the number of change points belonging to two consecutive areas positioned before and after the change point of said second reference clock to identify one of said first and second reference clocks as having smaller change points, and selects the correction time measured based on the identified reference clock.

15. The time measuring apparatus in accordance with claim 14, wherein said counting means uses said first reference clock, a first auxiliary clock having a phase difference of 90 degrees with respect to said first reference clock, the second reference clock having a phase difference of 180 degrees with respect to said first reference clock, and a second auxiliary clock having a phase difference of 270 degrees with respect to said first reference clock, and said counting means identifies an area to which a change point of each pulse signal belongs based on a signal level of each clock at a change point of each pulse signal.

16. The time measuring apparatus in accordance with claim 10, wherein said counting means uses said first reference clock, a first auxiliary clock having a phase difference of 90 degrees with respect to said first reference clock, the second reference clock having a phase difference of 180 degrees with respect to said first reference clock, and a second auxiliary clock having a phase difference of 270 degrees with respect to said first reference clock, and said counting means identifies an area to which a change point of each pulse signal belongs based on a signal level of each clock at a change point of each pulse signal.

17. A spectrum spread type distance measuring apparatus comprising:
  pulse train generating means for generating a pulse train corresponding to a pseudo-random noise code having a predetermined bit length in synchronism with a first reference clock;
  transmitting means for transmitting an electromagnetic wave modulated based on the pulse train generated by said pulse train generating means;
  receiving means for receiving a reflection wave reflected by a measurement object after said electromagnetic wave is transmitted from said transmitting means, and for restoring said pulse train;
  time measuring means for measuring a measurement object time based on the pulse train restored by said receiving means and said pseudo-random noise code, said measurement object time representing a duration from transmission of said electromagnetic wave to reception of said reflection wave; and
  means for detecting a distance from the distance measuring apparatus to said measurement object based on the measurement object time measured by said time measuring means,
  wherein said time measuring means comprises:
    coarse measuring means for measuring an approximate measurement object time based on said first reference clock, said approximate measurement object time representing a duration from a measurement start time to an input time of measurement object pulse; and fine measuring means, cooperating with said coarse measuring means and using a reference time of predetermined periods shorter than those of said first reference clock, for measuring a time difference between a change point of said first reference clock and the input time of measurement object pulse as a correction time of said approximate measurement object time, wherein coarse measuring means inputs said pulse train generated in accordance with the pseudo-random noise code in synchronism with the first reference clock, said pulse train serving as said measurement object pulse, and obtains the input time of measurement object pulse based on a correlation value between said pulse train and said pseudo-random noise code, and measures the approximate measurement object time representing a duration from the measurement start time to the input time of measurement object pulse, said fine measuring means measures a time difference between a change point of said first reference clock and a change point of at least one pulse signal of said pulse train as said correction time of said approximate measurement object time, and a precise measurement object time is obtained based on said approximate measurement object time measured by said coarse measuring means and said correction time measured by said fine measuring means.

18. The spectrum spread type distance measuring apparatus in accordance with claim 17, wherein said pulse train generating means generates surplus pulse signals for a predetermined time until an output of said receiving means is stabilized after said receiving means starts receiving said reflection wave, and then generates the pulse train corresponding to the pseudo-random noise code having a predetermined bit length in synchronism with a reference clock, and said time measuring means starts time measurement after said predetermined time has elapsed after said transmitting means starts transmission of said electromagnetic wave based on the pulse signal generated by said pulse train generating means.

19. A time measuring method, comprising the steps of:
generating a first reference clock at predetermined periods;
measuring an approximate measurement object time based on said first reference clock, said approximate measurement object time representing a duration from a measurement start time to an input time of measurement object pulse,
measuring a time difference between a change point of said first reference clock and the input time of measurement object pulse as a correction time of said approximate measurement object time by using a reference time of predetermined periods shorter than those of said first reference clock, and
obtaining a precise measurement object time based on said approximate measurement object time and said correction time.

20. The time measuring method in accordance with claim 19, wherein said step of measuring said time difference is performed based on a change point of said first reference clock closest to the input time of measurement object pulse.

21. The time measuring method in accordance with claim 19, wherein said reference time used in said step of measuring said time difference is a gate delay time of a gate circuit.

22. The time measuring method in accordance with claim 19, wherein
said step of measuring said approximate measurement object time is performed by using a spectrum spread type measuring device which inputs a pulse train generated in accordance with a pseudo-random noise code in synchronism with said first reference clock, said pulse train serving as said measurement object pulse, and obtains the input time of measurement object pulse based on a correlation value between said pulse train and said pseudo-random noise code, and said step of measuring said time difference is performed to obtain a time difference between a change point of said first reference clock and a change point of at least one pulse signal of said pulse train as said correction time of said approximate measurement object time.

23. The time measuring method in accordance with claim 22, wherein the step of measuring said time difference is performed to successively measure each time difference between a change point of said first reference clock and a change point of each pulse signal of said pulse train, and then obtain an average value of thus measured time differences as said correction time.

24. The time measuring method in accordance with claim 23, wherein the step of measuring said time difference is performed to measure said time difference for each pulse signal of said pulse train based on a change point of said first reference clock closest to the change point of said pulse signal.

25. The time measuring method in accordance with claim 24, wherein said step of measuring said time difference comprises the steps of:
successively measuring a duration from a common reference time to a change point of each pulse signal of said pulse train and a duration from the common reference time to a change point of said first reference clock; and
calculating a time difference between neighboring change points of said pulse signal and said first reference clock based on measurement result.

26. The time measuring method in accordance with claim 23, wherein said step of measuring said time difference comprises the steps of:
judging a distribution of change points of respective pulse signals of said pulse train in one period of said first reference clock;
identifying unnecessary pulse signals with reference to said distribution; and
excluding time differences calculated based on unnecessary pulse signals from calculation of said average value.

27. The time measuring method in accordance with claim 26, wherein said step of measuring said time difference comprises the steps of:
counting the number of change points of respective pulse signals belonging to each of time-divisional areas constituting one period of said first reference clock; and
identifying said unnecessary pulse signals which belong to an area having a small count number.

28. The time measuring method in accordance with claim 27, wherein said step of measuring said time difference comprises the steps of:
counting the number of change points of respective pulse signals belonging to each of four time-divisional areas constituting one period of said first reference clock;

calculating a difference Δ12 representing a difference between a count value of 1stMIN area and a count value of 2ndMIN area as well as a difference Δ23 representing a difference between a count value of 2ndMIN area and a count value of 3rdMIN area based on count result, wherein 1stMIN area has a smallest count value, 2ndMIN area has a next smallest count value, and 3rdMIN area has a third smallest count value; and identifying the unnecessary pulses whose change points belong to said 1stMIN area when the difference Δ12 is larger than the difference Δ23, or identifying the unnecessary pulses whose change points belong to said 1stMIN area and said 2ndMIN area when the difference Δ12 is smaller than the difference Δ23, or identifying the unnecessary pulses whose change points belong to said 1stMIN area, said 2ndMIN area, and 3rdMIN area when the difference Δ12 is equal to the difference Δ23.

29. The time measuring method in accordance with claim 28, wherein said step of measuring said time difference comprises a step of invalidating all of calculated time differences and prohibiting the calculation of said average value when said 3rdMIN area and MAX area are consecutive areas positioned before and after a change point of the reference clock used in the measurement of said time difference, wherein said MAX area has a largest count value.

30. The time measuring method in accordance with claim 23, further comprising a step of generating a second reference clock having a phase difference of 180 degrees with respect to said first reference clock, wherein said step of measuring said time difference comprises the steps of:
  obtaining a first correction time which is an average time difference between a change point of each pulse signal and a change point of said first reference clock;
  obtaining a second correction time which is an average time difference between a change point of each pulse signal and a change point of said second reference clock;
  judging whether a distribution of change points of respective pulses is closer to the change point of said first reference clock or closer to the change point of said second reference clock; and
  selecting said first correction time when said distribution of change points of respective pulses is closer to the change point of said second reference clock or selecting said second correction time when said distribution of change points of respective pulses is closer to the change point of said first reference clock.

31. The time measuring method in accordance with claim 30, wherein said step of measuring said time difference comprises the steps of:
  inputting said pulse train in synchronism with said first reference clock and measuring said approximate measurement object time based on a correlation value between said pulse train and said pseudo-random noise code;
  inputting said pulse train in synchronism with said second reference clock and measuring said approximate measurement object time based on a correlation value between said pulse train and said pseudo-random noise code; and
  selecting the approximate measurement object time based on said first reference clock when said first correction time is selected, or selecting the approximate measurement object time based on said second reference clock when said second correction time is selected.

32. The time measuring method in accordance with claim 30, wherein said step of measuring said time difference comprises the steps of:
  counting the number of change points of respective pulse signals belonging to each of four time-divisional areas constituting one period of said first reference clock;
  comparing the number of change points belonging to two consecutive areas positioned before and after the change point of said first reference clock with the number of change points belonging to two consecutive areas positioned before and after the change point of said second reference clock to identify one of said first and second reference clocks as having smaller change points; and
  selecting the correction time measured based on the identified reference clock.

33. The time measuring method in accordance with claim 32, wherein
  said step of counting the number of change points of respective pulse signals is performed based on said first reference clock, a first auxiliary clock having a phase difference of 90 degrees with respect to said first reference clock, the second reference clock having a phase difference of 180 degrees with respect to said first reference clock, and a second auxiliary clock having a phase difference of 270 degrees with respect to said first reference clock, and
  an area to which a change point of each pulse signal belongs is identified based on a signal level of each clock at a change point of each pulse signal.

34. The time measuring method in accordance with claim 28, wherein
  said step of counting the number of change points of respective pulse signals is performed based on said first reference clock, a first auxiliary clock having a phase difference of 90 degrees with respect to said first reference clock, the second reference clock having a phase difference of 180 degrees with respect to said first reference clock, and a second auxiliary clock having a phase difference of 270 degrees with respect to said first reference clock, and
  an area to which a change point of each pulse signal belongs is identified based on a signal level of each clock at a change point of each pulse signal.

35. A distance measuring method using a spectrum spread type measuring device, comprising the steps of:
  generating a pulse train corresponding to a pseudo-random noise code having a predetermined bit length in synchronism with a first reference clock;
  transmitting an electromagnetic wave modulated based on said pulse train;
  receiving a reflection wave of transmitted electromagnetic wave which is reflected by a measurement object, and restoring said pulse train;
  measuring a measurement object time based on the restored pulse train and said pseudo-random noise code, said measurement object time representing a duration from transmission of said electromagnetic wave to reception of said reflection wave; and
  detecting a distance from the measuring device to said measurement object based on the measurement object time, wherein said step of measuring said measurement object time comprises the steps of:
- measuring an approximate measurement object time based on said first reference clock, said approximate measurement object time representing a duration from a measurement start time to an input time of measurement object pulse; and
- measuring a time difference between a change point of said first reference clock and the input time of measurement object pulse as a correction time of said approximate measurement object time by using a reference time of predetermined periods shorter than those of said first reference clock, wherein said step of measuring said approximate measurement comprises the steps of:
- inputting said pulse train generated in accordance with the pseudo-random noise code in synchronism with the first reference clock, said pulse train serving as said measurement object pulse;
- obtaining the input time of measurement object pulse based on a correlation value between said pulse train and said pseudo-random noise code; and
- measuring the approximate measurement object time representing a duration from the measurement start time to the input time of measurement object pulse, wherein said step of measuring a time difference is performed to measure a time difference between a change point of said first reference clock and a change point of at least one pulse signal of said pulse train as said correction time of said approximate measurement object time, and a precise measurement object time is obtained based on said approximate measurement object time and said correction time.

36. The distance measuring method in accordance with claim 35, wherein
- said step of generating the pulse train comprises a step of generating surplus pulse signals for a predetermined time before generating the pulse train corresponding to the pseudo-random noise code, and
- said step of measuring said measurement object time begins after said predetermined time has elapsed after starting transmission of said electromagnetic wave based on the pulse signal.

* * * * *